Figure 1:
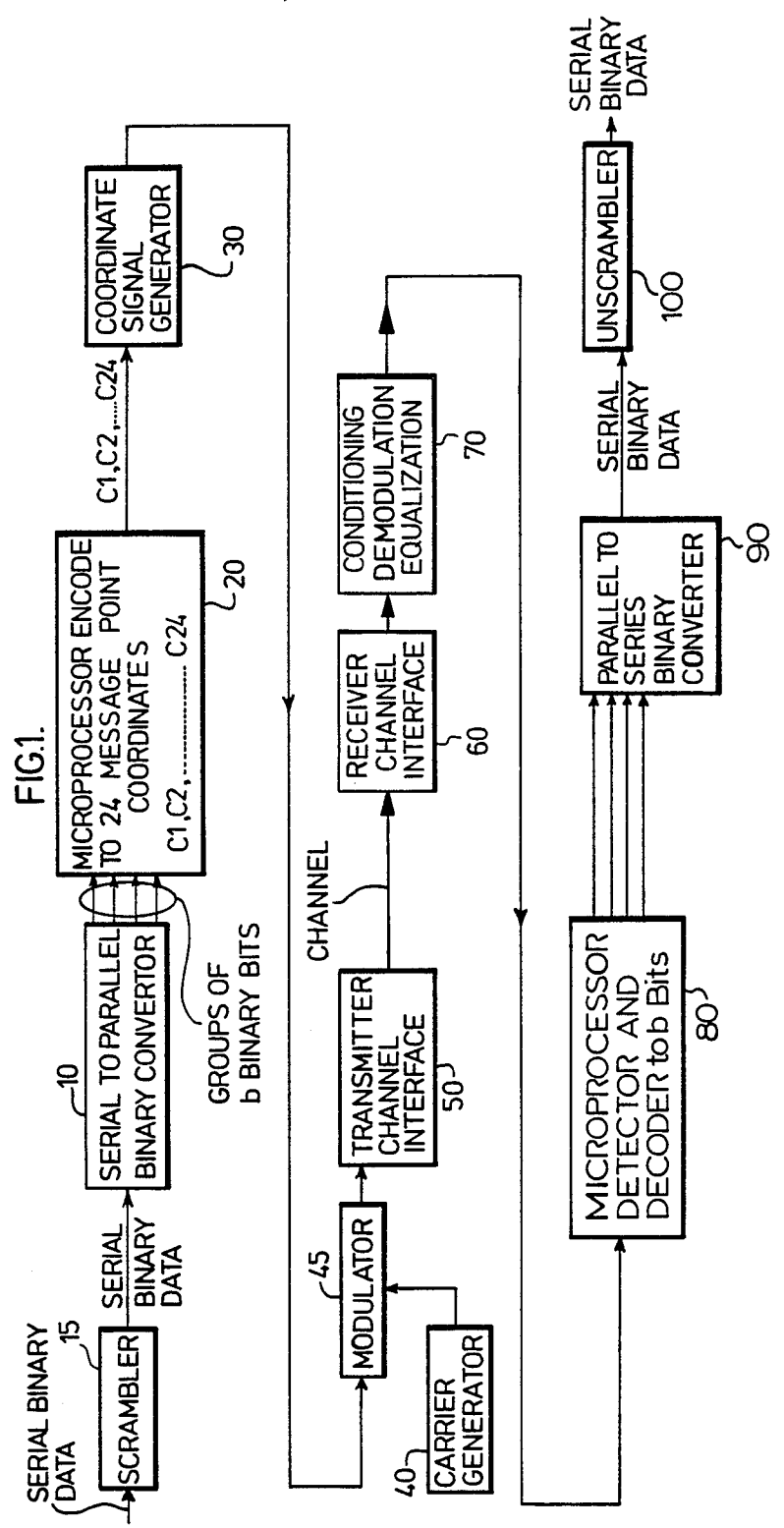

United States Patent [19]

Longstaff

[11] Patent Number: 4,733,401
[45] Date of Patent: Mar. 22, 1988

[54] BLOCK CODING INTO 24 COORDINATES AND DETECTION OF TRANSMITTED SIGNALS

[75] Inventor: Fred M. Longstaff, Islington, Canada

[73] Assignee: Motorola Canada Limited, N. York, Canada

[21] Appl. No.: 872,594

[22] Filed: Jun. 10, 1986

[51] Int. Cl.[4] ............................................. H04L 23/02
[52] U.S. Cl. ........................................ 375/37; 375/39; 370/21
[58] Field of Search ...................... 375/2.1, 25, 37, 39, 375/42, 58; 370/18, 21; 178/22.05, 22.06, 22.07; 371/37, 39, 40; 364/725, 826

[56] References Cited

U.S. PATENT DOCUMENTS

| | | | |
|---|---|---|---|
| 3,506,961 | 4/1970 | Abramson et al. | 371/40 |
| 3,792,355 | 2/1974 | Miyata et al. | 375/34 |
| 3,900,721 | 8/1975 | Speiser et al. | 364/725 |
| 4,510,578 | 4/1985 | Miyaguchi et al. | 364/725 |
| 4,630,288 | 12/1986 | Longstaff et al. | 375/39 |

*Primary Examiner*—Robert L. Griffin
*Assistant Examiner*—Stephen Chin
*Attorney, Agent, or Firm*—Harold H. Dutton, Jr.; Robert L. Westell

[57] ABSTRACT

In data transmission data is block encoded into 24 signal values determined by pattern vectors of a Leech matrix, detected and decoded. The decoder and, optionally, the decoder is (are) designed to operate with pattern vector from a Leech matrix which has been modified from the conventional form to the form:

| Col | 1 | 2 | 3 | 4 | 5 | 6 | 7 | 8 |
|---|---|---|---|---|---|---|---|---|
| Row | | | | | | | | |
| 1 | 1 | 1 | 1 | 1 | 1 | 1 | 1 | 1 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 1 | 1 | 1 | 1 |
| 5 | 0 | 0 | 1 | 1 | 0 | 0 | 1 | 1 |
| 6 | 0 | 1 | 0 | 1 | 0 | 1 | 0 | 1 |
| 7 | 0 | 0 | 0 | 0 | 0 | 0 | 0 | 0 |
| 8 | 0 | 0 | 0 | 0 | 0 | 0 | 0 | 0 |
| 9 | 0 | 0 | 0 | 0 | 0 | 0 | 0 | 0 |
| 10 | 0 | 1 | 0 | 0 | 1 | 1 | 0 | 1 |
| 11 | 0 | 1 | 0 | 1 | 0 | 0 | 1 | 1 |
| 12 | 0 | 1 | 1 | 1 | 0 | 1 | 0 | 0 |

| Col | 9 | 10 | 11 | 12 | 13 | 14 | 15 | 16 |
|---|---|---|---|---|---|---|---|---|
| Row | | | | | | | | |
| 1 | 0 | 0 | 0 | 0 | 0 | 0 | 0 | 0 |
| 2 | 1 | 1 | 1 | 1 | 1 | 1 | 1 | 1 |
| 3 | 0 | 0 | 0 | 0 | 0 | 0 | 0 | 0 |
| 4 | 0 | 0 | 0 | 0 | 1 | 1 | 1 | 1 |
| 5 | 0 | 0 | 1 | 1 | 0 | 0 | 1 | 1 |
| 6 | 0 | 1 | 0 | 1 | 0 | 1 | 0 | 1 |
| 7 | 0 | 0 | 0 | 0 | 1 | 1 | 1 | 1 |
| 8 | 0 | 0 | 1 | 1 | 0 | 0 | 1 | 1 |
| 9 | 0 | 1 | 0 | 1 | 0 | 1 | 0 | 1 |
| 10 | 0 | 1 | 0 | 0 | 1 | 1 | 0 | 1 |
| 11 | 0 | 1 | 0 | 1 | 0 | 0 | 1 | 1 |
| 12 | 0 | 1 | 1 | 1 | 0 | 1 | 0 | 0 |

| Col | 17 | 18 | 19 | 20 | 21 | 22 | 23 | 24 |
|---|---|---|---|---|---|---|---|---|
| Row | | | | | | | | |
| 1 | 0 | 0 | 0 | 0 | 0 | 0 | 0 | 0 |
| 2 | 0 | 0 | 0 | 0 | 0 | 0 | 0 | 0 |
| 3 | 1 | 1 | 1 | 1 | 1 | 1 | 1 | 1 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 1 | 1 | 1 | 1 |
| 8 | 0 | 0 | 1 | 1 | 0 | 0 | 1 | 1 |
| 9 | 0 | 1 | 0 | 1 | 0 | 1 | 0 | 1 |
| 10 | 0 | 1 | 0 | 0 | 1 | 1 | 0 | 1 |
| 11 | 0 | 1 | 0 | 1 | 0 | 0 | 1 | 1 |
| 12 | 0 | 1 | 1 | 1 | 0 | 1 | 0 | 0 |

15 Claims, 2 Drawing Figures

BLOCK CODING INTO 24 COORDINATES AND DETECTION OF TRANSMITTED SIGNALS

This invention relates to means and a method of signalling binary or other numeric data on a communications channel. The means and method encode blocks of b units of data into 24 coordinate signal values which 24 coordinate values are then modulated on a carrier by whatever modulation is desired. The means and method of the invention also extend to the detection and decoding at the receiver end of the channel.

By the term 'numeric data' in the application and claims there is envisaged data in binary or other numeric forms which will be supplied by physical signals in groups for conversion to message points. In the great majority of cases such data will be represented by binary digits. However, it is noted that the invention extends to data in the form of other numeric bases.

As hereinafter discussed in more detail, the invention particularly relates to a novel means and method of detecting the 24 coordinates after transmission and demodulation but before decoding.

The overall encoding, detecting and decoding means utilizes the fact that 24 independent signal values may be treated as the coordinates of a point in 24 dimensions. Signal structures in 24 dimensional space provide performance that is superior to other dimensional signal structures investigated. The superiority may be realized in terms of fewer errors at a given signalling rate or in terms of a higher signalling rate for a given statistical possibility of error.

A 'message point' is the point in 24 dimensions defined by the 24 coordinates.

The term 'message point' is not only used for points in 24 dimensions which are used for signalling but also for points in lesser dimensions. For example and as dealt with hereinafter a message point in H dimensions may be identified by the combination of a message point in F dimensions and a message point in G dimensions where F+G equal H. Thus, although the signalling is of message points in 24 dimensions, the term message point applies to points in less than 24 dimensions which are not signalled per se but which are used in algorithms related to encoding or decoding the 24 dimensional message point signalled. It may help with following the terminology herein to note that, in higher dimensions than one, a number of coordinates equal to the dimension is required to define a message point. In one dimension the coordinate is also the message point.

For encoding blocks of b data bits, signalling speed is related to the number of bits which may be encoded per block. A look-up table may be used for small values of b. However, the number of entires in such look up table varies as $2^b$ so that for large values of b the requirements would exceed the capacity of known computer or microprocessor look up tables.

This invention provides means and a method for deriving the coordinates in 24 dimensions to identify individual blocks of b digits. In particular, algorithms are provided which allow the conversion of each block of b digits into message point coordinates in 24 space which coordinates uniquely define the block of b digits represented.

Generally the invention utilizes the fact that message points defined by 24 coordinates may be considered as located in concentric shells about the origin (the point which has 24 0 values for coordinates) or about another datum defined by 24 coordinates.

A shell therefore contains those message points where $$\sum_{d=1}^{d=24} (Cd - CDd)^2$$

is the same value where C1, C2, ... C24 are the coordinates of the message point and CD1, CD2, ... CD24 are the coordinates of the datum.

The invention generally provide means and method which involves treating each block of b bits as a number N which identifies the sequence of bits in the block. The simplest rule is that the number N is the binary number represented by the sequence of bits in the block.

The invention herein uses 24 coordinates encoded in accord with a Leech matrix.

A Leech matrix has a classical 12×24 form as demonstrated in Table 1 below:

| Row No. | |
|---|---|
| 1  | 100000000000111111111111 |
| 2  | 010000000000110100011101 |
| 3  | 001000000000101000111011 |
| 4  | 000100000000110001110110 |
| 5  | 000010000000100011101101 |
| 6  | 000001000000100111011010 |
| 7  | 000000100000101110110100 |
| 8  | 000000010000111101101000 |
| 9  | 000000001000111011010001 |
| 10 | 000000000100110110100011 |
| 11 | 000000000010101101000111 |
| 12 | 000000000001111010001110 |

By adding all possible combination of rows of the Leech matrix column by column, modulo 2, ('modulo' is often abbreviated to 'mod' herein) it is possible to produce 4096 unique 24 series of 0 and 1 values known as pattern vectors. An example the pattern vectors for the mod 2 sums for 0 rows and rows 1, 2, 3 are:

| 0 rows    | 000 | 000 | 000 | 000 | 000 | 000 | 000 | 000 |
|-----------|-----|-----|-----|-----|-----|-----|-----|-----|
| 1,2,3 rows| 111 | 000 | 000 | 000 | 000 | 011 | 011 | 001 |

Coordinates in accord with the following rules provide very good packing in 24 dimensions. (See Scientific American, January 1984, page 116 "The packing of spheres, by N. J. A. Sloane)".

The rules for good packing in 24 dimensions are:

The 24 coordinates must be all even or all odd.

If even, the sum of the coordinates must be 0 mod 8; and

If odd, the sum of the coordinates must be 4 mod 8.

By good packing or relation to modulated communication signals is meant (a) that for given signalling power the message point defined by the 24 coordinates can have a relatively good chance (the best for known 24 space packing and better than other space packings) of being distinguished from the adjacent message points or, conversely (b) that one can use less power and have statistically a change of being distinguished from message points using other packings in 24 or other dimensions.

For encoding note the lattice of message points whose coordinates are all 0 mod 4 are centred about the point whose 24 coordinates are 0's and is related to the pattern vector with zeros in each of the 24 places. This lattice is known as the Z lattice. The remaining 4095 even and 4096 odd lattices are known as co-sets of the Z lattice are each respectively identified with one of the 4096 pattern vectors, and are reached by modifications of points on the Z lattice as hereinafter described.

Thus, in encoding the good packing is obtained with the Leech matrix by producing 24 coordinates on the Z lattice for modification in accord with a selected pattern vector. The modification is (when even coordinates are selected) to alter the Z lattice coordinates by 0 or 2 in the same sense depending on whether the selected pattern vector has a 1 or a 0 (and either but not both conventions may be used); and (when odd coordinates are selected) to alter the lattice coordinates by 1 in opposite senses depending on whether the selected pattern vector has a 1 or a 0 (and either but not both conventions may be used). (With odd coordinates, to maintain the modulo sum rule one coordinate must be increased or decreased by 3 instead of 1).

Thus a block of data bits may be converted into a number N. The number N is identified by the Leech pattern vector and whether consisting of even or odd coordinates together with a series of 24 coordinates. Selection of the vector and the choice of even or odd coordinates allows N to be divided by 8192 to give a quotient M and a remainder C. The quotient M is encoded as coordinates on the Z lattice (the lattice built upon the point whose coordinates are all 0's) as hereinafter described while twelve bits of C are used to selected the pattern vector to modify the Z lattice coordinates, and one bit of C indicates the selection of even or odd. The coordinates thus selected are converted to signals, modulated on a carrier and transmitted. On reception the demodulation produces values for the coordinates but these must be detected both as to quantum and as to which pattern vector was used and whether even or odd coordinates were used, before the most probable value of the transmitted coordinates may be selected and decoding performed by inversion of the encoding procedure.

This invention relates to the detection of 24 coordinate signals encoded as before described which utilizes a novel system of detecting at the receiver the pattern vector used in the transmission. The novel method of detection requires a (relatively) small number of decoding steps.

The same 4096 pattern vectors, which are developed from the conventional Leech matrix, may be developed from any matrix referred to as a 'modified Leech matrix' or 'modified matrix' derived from the conventional matrix, Table 1, by combinations of its rows added coordinate by coordinate mod 2, care being taken that the selection is such that the modified matrix will allow the development of the 4096 unique vectors.

The conventional or a modified Leech matrix may be modified by interchanging any whole columns. This will, of course, have the effect of correspondingly interchanging the pattern vector places and the effect on individual coordinates. This will not change the process described as long as the same matrix form is used both in encoding and decoding.

In the preferred embodiment as described herein the conventional Leech lattice has its columns interchanged and new rows made by the summation mod 2 of old rows (as referred to above and described in detail hereafter) to produce the matrix:

| 1 | 11111111 | 00000000 | 00000000 |
|---|----------|----------|----------|
| 2 | 00000000 | 11111111 | 00000000 |
| 3 | 00000000 | 00000000 | 11111111 |
| 4 | 00001111 | 00001111 | 00000000 |
| 5 | 00110011 | 00110011 | 00000000 |
| 6 | 01010101 | 01010101 | 00000000 |
| 7 | 00000000 | 00001111 | 00001111 |
| 8 | 00000000 | 00110011 | 00110011 |
| 9 | 00000000 | 01010101 | 01010101 |
| 10 | 01001101 | 01001101 | 01001101 |
| 11 | 01010011 | 01010011 | 01010011 |
| 12 | 01110100 | 01110100 | 01110100 |

The modified matrix is then used in encoding by having the dictates of pattern vectors derived therefrom superposed on Z lattice coordinates. The modified coordinates are modulated on a carrier and transmitted. The received transmission is demodulated and detected in accord with the preferred method and means disclosed herein. The coordinates are then decoded to recover the number M and therefrom the number N by use of the number C. The preferred method of detection makes use of the modified matrix, to detect the selected pattern vector used and even or odd. These of course are used to produce the Z lattice coordinates used.

The invention is described in relation to encoding, modulation and transmission at the transmitter and reception demodulation detection and decoding at the receiver. Thereafter the preferred encode, detection and decode algorithms are set out.

In the encoding step the number of bits or of other numerical data is converted to the number N. This number is divided by 8196 to provide a quotient M and a remainder C. The 13 bits of remainder C identify the pattern vector of the modified Leech matrix and whether the coordinates will be even or odd. For the quotient M, a table is provided listing the numbers (not the coordinates) of suitable message points for a sequence of shells in 24 dimensions. The means provided determines the shell in the sequence whereat the total available points in the sequence is greatest without exceeding M. The value $X_{24}$ being M less the number of points in the sequence, identifies (without locating) a point in the next succeeding shell in the sequence which will define M. The coordinates corresponding to the point are obtained by the use of splitting algorithms whereby $X_{24}$ is identified by specified shells and corresponding values of $X_F$ and $X_G$ for each of F and G dimensions where F+G=H (H in the first 'split'=24). By continuing the use of the splitting algorithm to lower and lower dimensional values, 24 corresponding values of the value $X_{24}$ in 1 dimension may be derived, the 24 one dimensional value identifying the value and sign of the coordinates C1, C2 . . . C24 which define the message point. These coordinates may then be modulated on the carrier. At the receiver, the demodulated and detected coordinates are subjected to a combining algorithm which is basically the reverse of the splitting algorithm and which allows the reconstruction of the number $X_{24}$ and the shell in 24 dimensions from the coordinates, and from that the numbers M and C (derived from the detection of the pattern vector and of whether even or odd was used) giving the number N and the block of b bits.

It will be noted that the use of splitting algorithms at the transmitter and of combining algorithms at the receiver avoid the use of large look up tables in converting the number M, identifying the block of b digits, to 24 message point coordinates for signalling and vice versa. Since look up tables of the required capacity are not available, the use of the splitting and combining algorithms allows signalling at speeds higher than previously.

Tables may be built up for use with the splitting algorithm beginning with the number of coordinates in 1 dimension which satisfy the coordinate requirements for signalling in 24 dimensions. These numbers are tabulated. It is found most convenient to tabulate these numbers using the concept of shells where each shell is numbered from 0 in regular intervals, each unit interval corresponding to an increase in the square of the radial distance, $r^2$ from the origin or datum in one dimension, by the square of the permissible interval between coordinates, the latter being used in integral form in most applications.

There is now discussed for 24 dimensions and using the modified Leech matrix (for use with the encoding algorithm to follow) an advantageous packing for encoding where the following rules apply. The coordinates are integers and must be all even or all odd. If all even the sum of the coordinate in the signalling dimension must be 0 modulo 8 and if all odd the sum of the coordinates must be 4 modulo 8. Using the Z lattice, the permissible coordinate interval is 4 and one (of 4096) pattern vectors provides such coordinates centred at the origin. The points on shells centered about the origin are contained on what is known as the "Z lattice". Accordingly, in one dimension, the table of permissible values* tabulated by shells is:

| Shell No. (I or J) | $r^2$ | No. of Available Points | Integral Coordinates |
|---|---|---|---|
| S0 | 0 | 1 | 0 |
| S1 | 16 | 2 | 4 or −4 |
| S2 | 32 | 0 | (none) |
| S3 | 48 | 0 | (none) |
| S4 | 64 | 2 | 8 or −8 | and it will be noted that the Shell No is 1/16 the value of the radius squared.

(*The terms 'permissible values' and 'available points' or 'available message points' are used interchangeably herein and 'points' means 'message points')

The available message points in 2 dimensions may be derived using the summing algorithm $$V_{H,n} = \sum_{I=0}^{I=n} V_{F,I} \times V_{G,n-I}$$

where n is the shell number, where the number of dimensions F plus the number of dimensions G equals the number of dimensions H; where $V_H$, $V_F$, $V_G$ are the number of available (i.e. satisfying the coordinate requirements) points in H, F, G dimensions respectively and the intervals of I are constant and chosen to ensure that the sum includes all such available points up to n times the square of the interval. I indicates the shell number in dimension F while n-I (often referred to as J) is the shell number in dimension G.

With the algorithm and with F=1, G=1, H=2 the following table is provided for 2 dimensions.

| Shell No. (I or J) | $r^2$ | Total Number of Available Points | Integral Coordinates |
|---|---|---|---|
| S0 | 0 | 1 | 0,0 |
| S1 | 16 | 4 | (±4, 0)(0, ±4) |
| S2 | 32 | 4 | (±4, ±4) |
| S3 | 48 | 0 | none |
| S4 | 64 | 4 | (±8, 0)(0, ±8) |

It will be seen that the algorithm may be used to provide the numbers of available points for all values of H by applying the algorith to tables for F and G where F+G=H. In this way the available points in 24 D for the Z lattice may be determined. Tables of numbers of available coordinate values for dimensions 1, 2, 4, 6, 12, 24 for an origin centred ('Z') lattice with intervals of 4 between coordinates are set out in tables Z1, Z2, Z4, Z6, Z12, 'Offset' attached to the algorithms herein. It should be noted that the Z24 'Offset' table does not include the points which, although derived from the Z12 tables in accord with the algorithm, do not satisfy the modulo rules for the coordinate sum, even through such points would have been indicated by the algorithm. Thus, it will be noted that table Z24 omits the points which the algorithm would have provided for odd numbered shells, since these would not have satisfied the modulo sum rule that the coordinates must be zero modulo 8 (where the coordinates are all even as in the Z lattice). Thus the coordinates are determined on the Z lattice and modified in accord with the selection of a pattern vector and of even or odd coordinates.

A specific embodiment is now described.

Figure 2:
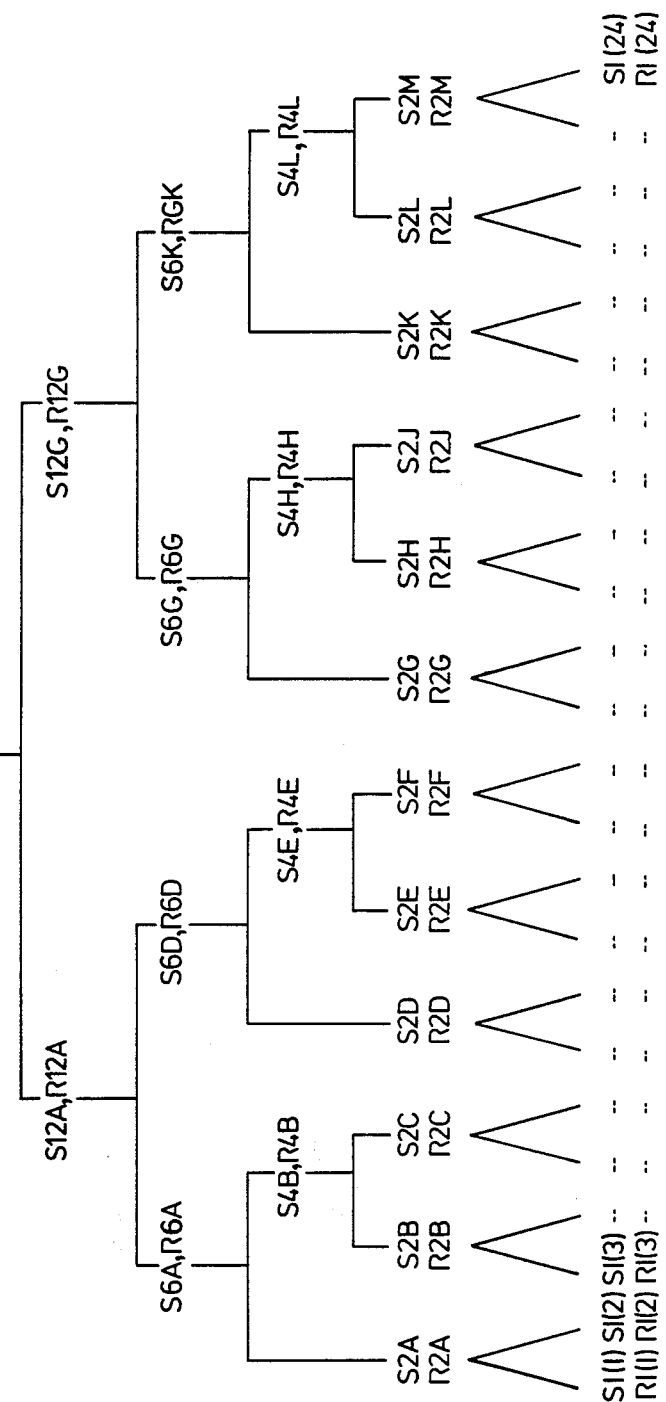

FIG. 1 shows schematically the overall circuitry employed with this invention including the program instructions and algorithms employed therewith, FIG. 2 shows the relationship of sequential uses of the splitting and combining algorithm.

In the drawings FIG. 1 schematically illustrates the functional operations performed in a communications system utilizing the invention. The functional operations are not intended to imply particular hardware or choices between hardware and software modes, except in blocks 20, 80 and 90. In block 20 and block 90 the microprocessors are programmed to perform the operation indicated. Although microprocessors are specified for use in various steps of the operation, the operation described may use any system adapted to provide the claimed means and methods.

Thus, as functionally illustrated in FIG. 1, serial binary data in blocks of b bits is scrambled at scrambler 15 and converted at serial to parallel convertor 10 into groups of b bits. At a data rate of 19,200 bits per second the data to be transmitted in one frame consists of 96 bits to be block encoded and if an auxiliary 200 bps channel is desired 97 bits must be block encoded. At 16,800 bits per second with an auxiliary channel, blocks of 85 bits must be encoded per block and at 14,400 bits per second, 73 bits must be encoded per block.

The groups of b bits are block encoded at block 20 into the values of 24 coordinates C1, C2, . . . C24 in accord with the encoding algorithm hereinafter provided. The values of the coordinates are converted to modulating signals in coordinate signal generate 30. The outputs of coordinate signal generator 30 and carrier generator 40 are converted at modulator 45 into a carrier modulated in accord with the values C1, C2, . . . C24. The invention is independent of the method of modulation. It will usually be preferred to use Quadrature Amplitude modulation QAM wherein the signals incorporating the coordinate values are modulated in twelve pairs by conventional quadrature methods. Several other forms of modulation are available. These include but are not limited to double side band-quadrature modulation (often abbreviated DSB-QAM). DSB-QAM includes modulation techniques such as phase-shift keying PSK, quadrature amplitude modulation (QAM), already referred to, and combined amplitude and phase modulation which have long been known in the art.

The modulated carrier signals from modulator 45 are provided to transmitter interface 50 and transmitted in the interfaced form to the channel. After reception from the channel at receiver interface 60 the received signals are demodulated, conditioned and equalized at block 70, all in accord with techniques well known to those skilled in the art. The output of block 70 is provided to the microprocessor detector and decoder 80 where by combined operation of the microprocessor and the detection method, the Leech pattern vector used and the transmitted coordinates C1, C2, . . . C24 are detected. The matrix in accord with the detection and decoding algorithms to be described converts these coordinates into the b bits of binary data which were supplied to the input of block 20 at the receiver. The reconstituted b bits are converted to serial binary data at convertor 90. The above cycle involving the encoding of b bits into 24 coordinate signals and resultant detection and decoding at the receiver will customarily be performed (at each end of the channel) 200 times per second, with the signalling speed in bits per second of bits b being determined by the number of bits b which are block encoded to correspond to each 24 coordinates. Circuitry for performing the functions described excepting those of blocks 20, and 80 is well known to those skilled in the art.

It is now proposed to describe the operation of the encoder 20, the description to be read with encoding algorithm appearing hereafter.

In the encoder 20 the b bits are to be encoded as a block of 24 coordinates so that dimension=24. Since a Leech pattern matrix is to be used, (see the Modified Leech matrix, used in the encoding algorithm which follows), there are 4096 pattern vectors which may be constructed therefrom by adding any combination of rows (including no rows) coordinate by coordinate modulo 2. The pattern matrix shown is not the classical form but is derived therefrom where each row of the pattern matrix is derived from a different combination (added coordinate by coordinate modulo 2) of the rows of the classical form including the corresponding row. The conventional Leech Matrix is shown below:

| Row No. | |
|---|---|
| 1 | 100000000000111111111111 |
| 2 | 010000000000110100011101 |
| 3 | 001000000000101000111011 |
| 4 | 000100000000110001110110 |
| 5 | 000010000000100111101101 |
| 6 | 000001000000100111011010 |
| 7 | 000000100000101110110100 |
| 8 | 000000010000111101101000 |
| 9 | 000000001000111011010001 |
| 10 | 000000000100110110100011 |
| 11 | 000000000010101101000111 |
| 12 | 000000000001111010001110 |

To produce the modified matrix for preferred use in the encode and decode steps and the necessary matrix for the detection step, the columns of the above matrix are rearranged into the sequence.

1, 18, 24, 22, 19, 10, 23, 3, 6, 8, 21, 16, 12, 15, 17, 7, 9, 13, 2, 4, 14, 5, 20, 11.

And then by creating new rows from the sums (mod 2) of the following old rows:

| New Row | Old Rows | |
|---|---|---|
| 1 | 1,3,10 | (The 'old rows' listed are |
| 2 | 6,7,8,12 | derived from a longer set |
| 3 | 2,4,5,9,11 | of mod 2 row additions |
| 4 | 3,7,10,12 | shown in Row Addition Table.) |
| 5 | 3,7 | |
| 6 | 3,7,8,10 | |
| 7 | 5,7,11,12 | |
| 8 | 2,4,7,11 | |
| 9 | 4,5,7,8,11 | |
| 10 | 3,5,7,8,10,11,12 | |
| 11 | 3,4,7,8,11 | |
| 12 | 2,4,5,8,10 | | to produce the modified Leech matrix as below:

| | | | |
|---|---|---|---|
| 1 | 11111111 | 00000000 | 00000000 |
| 2 | 00000000 | 11111111 | 00000000 |
| 3 | 00000000 | 00000000 | 11111111 |
| 4 | 00001111 | 00001111 | 00000000 |
| 5 | 00110011 | 00110011 | 00000000 |
| 6 | 01010101 | 01010101 | 00000000 |
| 7 | 00000000 | 00001111 | 00001111 |
| 8 | 00000000 | 00110011 | 00110011 |
| 9 | 00000000 | 01010101 | 01010101 |
| 10 | 01001101 | 01001101 | 01001101 |
| 11 | 01010011 | 01010011 | 01010011 |
| 12 | 01110100 | 01110100 | 01110100 |

(It may here be noted that the interchangeability of columns in a Leech matrix is merely one aspect of a more general rule that the coordinates of an orthogonal system may be interchanged freely as long as the interchanged order is maintained. Thus although coordinates in three dimensions are customarily written in the order (X,Y,Z,) they may be written (Z,X,Y,) (Z,Y,X,) or in any other sequence as long as the sequence is maintained throughout the calculations. Where alternate lattices are available for coordinate selection the lattice columns may be interchanged since this will effect the interchange of coordinate order and the results will be the same as long as the interchanged column order is maintained throughout the use or calculations).

It should be emphasized however that for the preferred detection method and means taught herein the modified Leech matrix or a matrix with the same column arrangements must be used at the detector stage.

Since the Pattern Matrix provides 4096 pattern vectors and coordinates modified by each of these patterns may be even or odd, the number N which identifies the bit sequence in the block of b bits is divided by 8192 to provide a quotient M and a remainder C. The quotient M will be encoded to 24 coordinates of a message point on the Z lattice and, after such encoding, the coordinates will be modified in accord with the selected pattern vector and the choice of even or odd coordinates, both being determined by the number C.

In the encoding algorithm of the embodiment Z tables are provided for dimension 1, 2, 4, 6, 12 and 24. Each dimension table, called Z1, Z2, Z4, etc., tabulates for shell number the number of points which satisfy the coordinate rules (the coordinate modulo sum rules are not considered except in 24 dimension). The shell number in each table is 1/16 the square of the radius ($r^2$) measured from the origin, in the dimension being considered, to each of the set of coordinates making up the entry for that shell number. The value of 1/16 is derived from the fact that each coordinate value is separated from the next value by four units (in accord with the modulo rules for the coordinates as distinct from the rules for the coordinate sum) so that the coordinates of a point, in whatever dimension, will occur at some of the steps $r^2=0$, 16, 32, 48 etc., from the origin.

Each Z table is constructed from the next in accord with the combining algorithm $$V_{H,n} = \sum_{I=0}^{I=n} V_{F,I} \times V_{G,n-I}$$

(where H, F and G are dimensions and F+G=H) for unit steps of I. This is worth noting since the splitting algorithm used to determine the coordinates corresponding to a number M is based on the structure of the above algorithm used to make the tables. The Z24 table which is the basis for the 'Offset Table' used with the encode, detect, decode algorithms, does not include the values for the odd shell numbers, which the above algorithm would provide, since such the coordinates of points on such odd numbered shells will not satisfy the 0 modulo 8 requirements of the coordinate sum for 24 dimensions (all even coordinates) and The Offset Table provides, for each even shell number, the total number of points on the previous shells in the sequence defined by the shell table. By locating the Offset Table entry with the highest value not exceeding M the shell is identified where the message point represented by M will be located and the value M less the Offset table value, gives a value D (otherwise referred to as $X_{24}$) which identifies the point on the selected shell. By use of the splitting algorithm forming part of the encoding algorithm the value D which identifies a point on the selected 24 dimensional shell is used to derive first number $X_{12(F)}$ on a first 12D shell and a second number $X_{12(G)}$ on a second 12D shell. Continued use of the splitting algorithm as described in the encoding algorithm and will eventually derive 24 selected one dimensional shell numbers and for each an accompanying value which will be 0 or 1. Each of the Z lattice coordinates may be derived from the one dimensional shell number by taking the square root of the shell number and multiplying by 4. (It will readily be appreciated that one dimensional coordinate values could have been used throughout instead of the shell number, thus avoiding the last computation. However it is, at least conceptually, easier to use shell numbers). The 24 derived Z lattice coordinates define a point on the Z lattice defining quotient M. The coordinates are then modified in accord with a pattern vector derived from the modified leech lattice to take into account the value C. Even or odd coordinates are selected in accord with whether C is even or odd, 12 higher binary places of C define a number from 0 to 4095 which is used to select one of the 4096 pattern vectors. The coordinates are then modified as follows: (1) If C is odd, subtract 3 from the first of the 24 lattice point coordinates if the first bit of the pattern vector is a zero or add 3 if it is a one. For the remaining 23 Z lattice point coordinates add 1 if the corresponding pattern bit is a zero or subtract one if it is a one. It will be obvious that any coordinate could have been varied by 3 instead of the first although using the first is easier for programming purposes. It will further be obvious that the roles of the ones and zeros in the pattern vector may be reversed. (2) If C is even add 2 to each Z point lattice point coordinate for which the corresponding pattern vector is a one. It will also be realized that the roles of the ones and zeros can be reversed with the even C pattern vector. It will of course be obvious that such alterations in the encode program will require corresponding changes in the decode program.

In the encode algorithm which follows "S" stands for "shell" number. In such algorithm two shell numbers are involved I is one of these and J is the other. In tables Z1, Z2, Z4, Z6, Z12, the number on the left is the shell number and the number on the right is the number of available points in that shell noting that in the Z lattice the coordinates are all 0 modulo 4. In the offset table the shell number is the left column and the number in the right column is the total number of available points in the shells preceding the row in question. The total number of available points is limited to those satisfying the coordinate requirements and the modulo requirements for the coordinate sum in the offset table.

The principle of the splitting algorithm, as used in steps 4–26 of the encoding algorithm may be demonstrated by FIG. 2. A point defined as number D on a shell S24 in 24 space may be also defined by number R12A on shell S12A in 12 dimensional space together with number R12G shell S12G in 12 dimensional space. Each number and shell in 12 dimensional space may be identified by a pair of number and shell combinations in 6 dimensional space, and so on.

It will thus be seen that when in accord with the encoding algorithm the entry in the offset table is located with the largest offset number less than M, then the shell on which the point corresponding to D (equivalent to $X_{24}$) has been found and the value D=M—the offset number identifies a point on the shell, and the combination of shell number and D identify the number M.

The splitting algorithm described is then used to sequentially replace each combination of a shell number and a number identifying a point on the shell, in a dimension H, with two combinations of shell number and a point identifying number in dimensions F and G where F+G=H. This process is continued with F=G=1 whereby the coordinates and their signs can be identified. The 'tree' of operations of the splitting algorithm is indicated by downward travel in FIG. 2.

In the encoding algorithm to follow the following points are noted. The algorithm relates to signalling using 24 message point coordinates. Since there are 4096 lattice centres and each may be used with 24 coordinates with the choice of making them all even or all odd the number N identifying the bit sequence in a block of b bits is divided by 8192 producing a quotient M and a remainder or coset point C. The designation D ($X_{24}$) refers to the general discussion where '$X_K$' designates a point on a shell in K space and the designation D is used for $X_{24}$ in the algorithm to follow.

Further in the encode, detection and decode algorithms used herein the symbol '*' represents the multiplication operation or 'x'.

It will be noted, that in step 4 of the splitting algorithm 'X' is divided "by entry I of table A". It will be appreciated that what is happening here is that the number X is to be assigned to two shells is being divided by entry I representing the first assigned shell's capacity of available points, to obtain a quotient Q to be assigned to the second assigned shell and a remainder (R), to be assigned to the first assigned shell. Obviously the roles can be reversed and division may be performed by the entry for second shell to obtain a quotient to be assigned to the first and a remainder to the second. This is equivalent to the procedure outlined if a corresponding complementary operation is performed at the decoder.

Also it will be noted that the sequence of shells represented by the offset table need not be in the order of rising shell number although this appears the most convenient for programming. However, the tables Z1-Z12 should be in order of rising shell number for convenience and simplicity in programming.

The choice of even or odd coordinates, together with the selection of pattern vectors all having determined the coordinates C1, C2, ... C24 by the encoding algorithm these are provided by the microprocessor encoder 20 to the coordinate signal generator 30 which generates modulating signals in accord with the coordinate values. The modulating signals from coordinate generator are modulated on the carrier at modulator 45, to provide the modulated carrier signal to the transmitter channel interface 50. The type of modulation used is not limited by the invention and may be any of a large number of types as previously discussed. Most commonly QAM (quadrature amplitude modulation) will be used.

The signal transmitted from the transmitter channel interface 50 on the channel is received at the receiver channel interface 60. The signals received are subjected to conditioning, demodulation and equalization at block 70, all blocks 15,10,30,40,45,50,60,70,90 and 100 being designed and operated in accord with techniques well known to those skilled in the art.

The conditioned, demodulated and equalized signals having the values $C1-\frac{1}{2}$, $C2-2$ ... $C24-\frac{1}{2}$ are supplied to the detector 80 shown in FIG. 2 and described in the programming instructions for the detection algorithm described hereafter. The following comments on the detection algorithm programming steps, should be read therewith.

In accord with the detection method of the invention the transmitted coordinates which have been encoded and modulated at the transmitter are, at the receiver, demodulated. The demodulated received values have $\frac{1}{2}$ added to compensate for the deduction in step 32 of the encoding algorithm. The received values each augmented by $\frac{1}{2}$ are stored. Also stored are their values mod 4 (detection algorithm step 2), and mod 8.

Some aspects of the following discussion and the detection algorithm depend upon the consideration of any set of 24 coordinates in groups of 8, that is group 1 (g 1)-coordinates 1st to 8th; group 2 (g 2)-coordinates 9th to 16th and group 3 (g 3)-coordinates 17th to 24th. Such groups are known as first, second and third octuples herein.

It is possible to demonstrate that within the 8192 possible vectors (4096 pattern vector, multiplied by 2 for the choice of even or odd coordinates) that there are 256 possible values for the coordinates (mod 4) in an octuple which may be arranged in 128 complementary pairs. (See these complementary pairs in Table 2).

It is possible to demonstrate that of the possible pattern vectors there are only 1024 patterns of the first and second octuples (taken together and sometimes referred to as a dual octuple) which may be arranged in 128 groups of eight.

The demonstration is: The detection algorithm is based on the following derivation from the conventional Leech matrix. It may be noted that the Leech matrix becomes an equivalent matrix and produces the Z and coset lattices with any different sequence of coordinates and furthermore any rows may be replaced by the addition of mod 2 of other rows as long as all rows are represented as components of sums in the final matrix to avoid a singular matrix. The following form may be obtained from the conventional Leech matrix by re-arranging the columns into the sequence: (numbers are of conventional matrix columns) 1,18,24,22,19,10,23,3/6,8,21,16,12,15,17,7,/9,13,2,4,12,-5,20, 11. Th strikes indicate the division between octuples.

And then by creating new rows from the sums (mod 2) of the following old rows:

| New Row | Old Row Abbreviated |
|---|---|
| 1 | 1,3,10 |
| 2 | 6,7,8,12 |
| 3 | 2,4,5,9,11 |
| 4 | 3,7,10,12 |
| 5 | 3,7 |
| 6 | 3,7,8,10 |
| 7 | 5,7,11,12 |
| 8 | 2,4,7,11 |
| 9 | 4,5,7,8,11 |
| 10 | 3,5,7,8,10,11,12 |
| 11 | 3,4,7,8,11 |
| 12 | 2,4,5,8,10 |

See Row Addition Table for full list.
Thus producing:

| | | | |
|---|---|---|---|
| 1 | 11111111 | 00000000 | 00000000 |
| 2 | 00000000 | 11111111 | 00000000 |
| 3 | 00000000 | 00000000 | 11111111 |
| 4 | 00001111 | 00001111 | 00000000 |
| 5 | 00110011 | 00110011 | 00000000 |
| 6 | 01010101 | 01010101 | 00000000 |
| 7 | 00000000 | 00001111 | 00001111 |
| 8 | 00000000 | 00110011 | 00110011 |
| 9 | 00000000 | 01010101 | 01010101 |
| 10 | 01001101 | 01001101 | 01001101 |
| 11 | 01010011 | 01010011 | 01010011 |
| 12 | 01110100 | 01110100 | 01110100 |

This is referred to herein as the 'Modified Leech Matrix'.

The essential features of this form are: that the first three rows have all zeros in two of the three octuples and all ones in the other octuple (in successively the first, second and third octuples). the next three rows have two identical octuples followed by eight zeros and the next three rows have eight zeros followed by two of these same 8-tuples. The final three rows each consist of three identical 8-tuples.

Any subset of rows of the above matrix may be selected and exclusive ored together (i.e. summed modulo 2) to produce one of 4096 possible pattern vectors.

The coordinate rules for 24 place coordinate sets derived from the Leech lattice are then:

They may be 24 even integers which are 0 mod 4 where a pattern vector has a 0 and 2 mod 4 where the same pattern vector has a 1 and the sum of the coordinates is 0 mod 8.

Or they may 24 old integers which 1 mod 4 where a pattern has a 0 and 3 mod 4 where the pattern vector has a 1 and whose sum is 4 mod 8.

The "detection problem" is: Given an arbitrary point in 24-space as represented by 24 given coordinates, determine the pattern vector used and the choice of odd or even coordinates associated with the Z or co-set lattice point closest to the given point.

The essential feature of this detection method may be seen by noting:

Within any octuple there are only 128 different patterns and that these fall into 64 pairs which differ by 11111111 (and therefore are complements since the rows are added, mod 2) as determined by rows 1, 2 or 3.

Within the first 16 coordinates (or dual octuples), rows 4 to 12 produce only 512 patterns which may be divided into 64 groups of 8 where the members of a group differ only by the choice of rows 4, 5 and 6.

It has previously been explained that columns in the Leech matrix used, may be interchanged as long as the same conversion is used at transmitter and receiver as performed in the preferred embodiment, or in an alternate method in accord with the invention at the beginning and end of the pattern vector detection process. (In the alternate method it will be noted that one version of the matrix can be used during encoding, modulating transmission and initial reception and demodulation. After demodulation the places of the coordinates may be interchanged to render detection easier. This has, at this stage, (since the characteristics of a pattern vector are impressed upon the coordinate values), the same effect as the interchanging of matrix columns before the pattern vector is selected. After the detection of the pattern vector used, the coordinates and the pattern vector values may have their order returned to that transmitted and originally received, for further processing.) In the preferred method the 24 coordinates representing a block encoded group of bits have been chosen at the transmitter (a) to satisfy the individual coordinate modulo rules and the coordinate sum modulo rules and (b) for modification in accord with a particular Leech pattern vector; and (c) whether they are to be all even or all odd. Such modified coordinates are modulated on a carrier and transmitted. Such modulation, whatever they type used, is usually in accord with a quadrature system and under such system the coordinates are modulated on the carrier in pairs.

At the receiver the detected signals are demodulated and the received values of the coordinates stored. Such received coordinates differ from those transmitted due to the effects of distortion, noise, and other causes during modulation, encoding and transmission and the problem of detection is, of course, to determine the pattern vector used and the actual coordinates encoded.

In the detection algorithm:

For detection of the pattern vector used the process uses $C_n$ the value of the demodulated coordinates where n=1 to 24, is the number of the coordinate. $X_n$ is $C_n$ mod 4.

$X_n$ is composed of $I_n$, an integral and $F_n$, a fractional part. It will be noted that, (since $X_n$ is calculated mod 4) the value $I_n$, may be 0, 1, 2, 3. k is the possible transmitted value of $I_n$ and likewise varies through 0, 1, 2, 3.

A table (Table 1) is provided having, for each value $I_n$, the four values of k. For each of such combinations there is calculated:

$M_{n,k}$: a measure of the square of the distance from $X_n$ to k, a 'measure of the error'

$P_{n,k}$: a positive measure of the difference of squared distance $M_{n,k}$ and the squared distance from $X_n$ to the closer of k+4, k−4. Thus $P_{n,k}$ represents the penalty or increase in the value $M_{n,k}$ if the closer of k+4 or k−4 has later to be substituted for k to achieve the modulo sum rules for 24 coordinates.

$B_{n,k}$: is an 0 or 1 value designed to give, for each of the 24 coordinates, an indication of the effect of the coordinate on the modulo sum requirements. If $I_n$ mod 4 does not equal the integral value of $C_n$ mod 8 then the value for $B_n$ in Table 1 must be complemented.

In a particular combination of circumstances, as described hereafter, where complementary octuples are being compared & $B_{n,k}$ is different for the two; $P_{n,k}$ will sometimes be increased to cover the increase of error measure on switching from one to the other octuple.

Table 2 contains 128 pairs k1,k2 of octuple groups (j) of coordinates modulo 4. In each pair the two octuples are complements, that is, for even pairs, the 2's and 0's are interchanged and, for odd pairs the 1's and 3's are interchanged.

(It may be noted that such pairs occur due to the effect of the first three rows of the modified Leech matrix. Thus the production of a complement value for the first second, third, octuple g1,g2,g3, is due to the fact that each place in the octuple contains a one if the first, second, third row respectively, is included and zero if the others of rows 1, 2 or 3 are included. Thus from the selection of k1 vs k2 values in the first 24 mod 4 coordinates, 3 of the 13 bits are determined indicating the combination of modified matrix rows one to three used).

For each pair of Table 2 the group sums, SUM of the values $M_{n,k}$ over an octuple are compared and the octuple of the pair with the lower SUM is selected $GM_{g,j}$. A record of which octuple is selected is stored. $RN_{g,j}=0,1$ corresponds to SUM for k1 smaller, larger than k2 respectively. Records are made of the storage and use of the penalty values P1 in case a switch or 'flip' must be made from the closest to the next closest k+4 value to satisfy the modulo sum rules for 24 coordinates.

Penalty values must be assembled in case of the necessity for a 'flip'. The term 'flip' refers to the situation where the 24 mod 4 coordinate total does not satisfy the coordinate sum modulo 8 rule, and it is necessary to find the change of k to k+4 or k−4 or alternate change that will cause the smallest increase in $GH_{g,j}$ such increase being the smallest penalty $P_{n,k}$.

The general approach to calculating the penalty $GP_{g,j}$ for a given octuple from table 2, reflected in paragraphs 3 is to note the smallest $P_{n,k}$ for each octuple.

The sum SUM 1 of the $M_{n,k1}$ values is compared with the sum SUM 2 of the $M_{n,k2}$ values and the smaller designated $GM_{g,j}$.

1. If the contribution of $B_{nj}$ to the mod 8 sum for 24 coordinates is the same for both k1 and k2 values of an octuple pair then the 'flip' value SUM 1+ smallest $P_{n,k1}$ is compared with SUM 2+ smallest $P_{n,k2}$.

(a) If SUM 1<SUM 2 and the flip values involving SUM 1< those involving SUM 2 then SUM 1=$GM_{g,j}$ and $P_{n,k1}$=$GP_{g,j}$.

If both inequalities are reversed the SUM 2=$GM_{g,j}$ and $P_{n,k2}$=$GP_{g,j}$.

(b) If SUM 1<SUM 2 but SUM 1+ smallest $P_{n,k1}$ is > than SUM 2+ smallest $P_{n,k2}$ then SUM 1=$GM_{g,j}$ but the penalty $GP_{g,j}$ is SUM 2+ smallest $P_{n,k1}$−SUM 1. If both inequality signs are reversed then SUM $2=GM_{g,j}$ and $GP_{g,j}$ is the SUM 1+ smallest $P_{n,k1}$−SUM 2.

Thus what has been determined here is, $GM_{g,j}$—a measure of the error value for the lower table of a pair, and also the penalty or increase in error measure is the modulo 8 increment of the octuple must be altered, and whether a lower penalty is incurred by a 'flip' of one coordinate of the octuple or by switching to the other octuple and flipping a coordinate of the latter.

2. If the combination of $B_{n,j}$ to the mod 8 sum for 24 coordinates is different for the k1 and k2 values of an octuple pair then if a flip is required for the smaller SUM=$GM_{g,j}$ the penalty by flipping a coordinate of the selected octuple is compared with the penalty by substituting the other octuple and the lower penalty stored as $GP_{g,j}$ with a stored direction whether, if such flip is required, the coordinate is flipped or the other octuple substitute.

The $G_{m,g}$ values and $RN_{g,1}$ the 128 pairs winners are identified with the corresponding "j" value of Table 2. It will be noted that for any of the three possible octuples (mod 4) making up the 24 coordinates, mod one of two choices has been eliminated and this result is the equivalent of 3 bits of information of the 13 required, that is the 12 bits to identify the modified matrix rows use to make the pattern vector and one to identify the selection of whether even or odd coordinates have been chosen.

Table 3 values are expressed in base 8 (octal) values for brevity. Thus each octal digit corresponds to three consecutive binary digits.

Comprising table 3 with the modified Leech matrix it will be noted that, in each row of eight dual octuples, the only difference between such dual octuples is the eight possible combinations of use of rows 4, 5 and 6 of the modified Leech matrix. It may also be noted that the same j3 value may be used for each of the J1,j2 dual octuple pairs because the third octuple of each of rows 4, 5 and 6 of the modified matrix consists of eight 0's.

As elsewhere described the summing of the values $GM_{n,j}$ for the first two octuples as paired by table 3 are summed to determine lowest $GM_{n,1}+GM_{n,2}$ for each of the 128 sets of eight.

It should be noted that the lowest sum for each group of eight may be determined by summing corresponding to only the first two octuples j1,j2. Adding the third octuple is unnecessary because, for any row group of eight j3 is the same for each member of the group. If, instead of rows 4, 5 and 6, the rows 10, 11 and 12 had been used to determine the components of the eight row sets of table 3, j3 would have been different for each row set and the winner of the row set would have had to be determined by summing j1, j2, j3 for each row in the set. On the other hand if rows 7, 8, 9 had been used to distinguish the eight components of the row sets (because of the eight zeros in each first octuple) j1 would have been the same for the J2 and j3 values would have been set out as the dual octuples of table 2.

With the 128 candidates from the best candidates of the row sets of Table 3 then to each sum $GM_{n,1}+GM_{n,2}$ is added the $GM_{n,3}$ as determined by the $Gm_{n,j3}$ of the j3 of the table. The $B_{n,1}+B_{n,2}+B_{n,3}$ values are similarly summed (mod 2). If the modulo sum, as indicated by the summed B values, is incorrect then the coordinate lowest $GP_{n,j}$ is added with or without the substitution of a complementary octuple as previously described.

The 128 error measure sums $$\sum_{j=1}^{j=3} GM_{n,j}$$

sometimes augmented by $GP_{n,j}$ are used to determine the winner and if appropriate to substitute a complementary octuple as previous discussed. Thus the lowest error measure sum of the 128 candidates is the winner.

With such 'winner of 128' the 13 bits to identify even and odd and the Leech matrix pattern vector can be determined, as discussed and, as shown are indicated by the octal digits in the 'bits' column of Table 3.

The $GM_{g,j}$, $GP_{g,j}$, $GB_{g,j}$, $RN_{g,j}$, $RF_{g,j}$ for the 128 pair winners are identified with the corresponding "j" value of Table 2. It will be noted that for any of the three possible octuples (mod 4) making up the 24 coordinates, one of two choices has been eliminated in step 2 and this result is the equivalent of 3 bits of information of the 13 required, (that is the twelve bits to identify the pattern vector and one to identify whether even or odd coordinates have been chosen).

Since row $k_2$ is the obvious complement of $k_1$ it will be noted that $k_2$ will have a lower $G_m$ when rows 1, 2, 3 of the modified Leech matrix have been used for (what turns out to be) the first octuple, second octuple and third octuple respectively, since the eight 1's in the matrix octuple will (mod 2 addition) produce the complement. Thus these $k_1$ v $k_2$ candidates in the three octuples in the final result will provide the first three bits of the row determinant.

The 'row determinant' is the series of 12 binary digits which determines which of the rows of the Leech or modified Leech matrix are summed, mod 2 to produce the pattern vector. Thus the row determinant 010 010 010 010 states that the second, fifth, eighth and eleventh rows of the modified Leech matrix should be added mod 2 to produce the pattern vector.

Table 3 gives the 512 possible combinations of the first two octuples j1, j2 in pattern vectors derived from a modified Leech matrix. Actually Table 3 gives 256 values which are doubled by considering there is a further table differing from the first only in that a 1 is added before each j1, j2 (and j3 in a later step).

To be consistent with the previous discussion, and in use, j1, j2, j3 are binary digits. However for compactness herein these j values are expressed in octal notation and each octal digit represents three successive binary digits.

In Table 3, the eight sets of j1, j2 values in each row convey through the first octal digit in the bits column, the presence of the modified matrix rows (reading the rows from left to right):

| Octal Digits bits column | 0XX | 1XX | 2XX | 3XX | 4XX | 5XX | 6XX | 7XX |
|---|---|---|---|---|---|---|---|---|
| Rows 4,5 or 6 of modified matrix | 0* | 4 | 5 | 4 & 5 | 6 | 6 & 4 | 6 & 5 | 654 |
| Binary Digits** | 000 | 001 | 010 | 011 | 100 | 101 | 110 | 111 |

-continued

| Octal Digits bits column | 0XX | 1XX | 2XX | 3XX | 4XX | 5XX | 6XX | 7XX |
|---|---|---|---|---|---|---|---|---|
| for row determinant | | | | | | | | |

*only rows 4,5 and 6 are excluded other rows may be included.
**each of these will be followed by six bits which may be 0 or 1 as otherwise determined and preceded by 3 bits determined by $RN_1$, $RN_2$, $RN_3$.

Thus the presence of rows 4, 5 and 6 in the mod 2 sum is determined by the three bits which are set out above and the order would normally be reversed to place the bits indicating use of rows 4,5 and 6 in places 4,5 and 6 respectively, of the row determinant.

With each of the 128 winners of the dual octuple sets, including the 64 starting with the added 1 to j1 and j2, and j3 value is added with a preceding 0 or 1 to agree with the j1 and j2 values.

The values $$\sum_{j=1}^{j=3} GM_{n,j}$$

are added for the j1, j2, j3 sometimes augmented by a $GP_{n,j}$ in case of each of the 128 dual octuple winners and the lowest sum determines the winner. The effect of the determination of places 4,5 and 6 of the row determinant has already been described. In the "best of 128" competition and Table 3, it will be noted that for each set of eight rows (e.g. bits XX0 to XX7) the last digit determines the inclusion or not of rows 7,8 and 9 of the modified matrix in the pattern vector modulo 2 sum as follows:

| Octal Digits bits Column | Binary Digits | Rows 7,8 or 9 of modified matrix |
|---|---|---|
| XX0 | 000** | 0* |
| XX1 | 001 | 7 |
| XX2 | 010 | 8 |
| XX3 | 011 | 7 & 8 |
| XX4 | 100 | 9 |
| XX5 | 101 | 9 & 7 |
| XX6 | 110 | 9 & 8 |
| XX7 | 111 | 9,8 & 7 |

*none of rows 7,8 or 9 but may have some of rows 1-6 or 10-12.
**preceded by 9 binary digits.

Thus the seventh to ninth places of the row determinant may be chosen to indicate the presence or absence of rows 7,8 or 9 in the modulo 2 sum.

In the "best of 128" competition and Table 3, it will be noted that for each of the eight sets of sets of eight rows (e.g. with bits values X0X to X7X, the middle octal digit represents the extent of usage of rows 10,11,12 of the modified matrix. The middle octal digit determines the inclusion of rows 10,11 and 12 as follows:

| Octal Digits* bits Column | Binary Digits** | Rows 10,11,12 of modified Leech matrix |
|---|---|---|
| X0X | 000 | 0*** |
| X1X | 011 | 10 |
| X2X | 010 | 11 |
| X3X | 011 | 11 & 10 |
| X4X | 100 | 12 |
| X5X | 101 | 12 & 10 |
| X6X | 110 | 12 & 11 |
| X7X | 111 | 12,11 & 10 |

*chosen from successive vertical sets of eight.
**preceded by six and succeeded by three bits.
***none of rows 10,11 or 12 but may have some of rows 1-9.

Thus the tenth to twelfth places of the row determinant may be chosen to indicate the presence or absence of rows 10,11 or 12 in the modulo 2 sum.

Thus the twelve digits indicating the rows combined from the modified Leach matrix to produce the pattern vector may be ascertained.

The first number of any j that is the added 1 or 0 of "the best of 128" winner will determine even or odd.

Thus the bits in the row determinant and hence (if the bit is one) the use of the corresponding rows in the mod 2 sums are determined as follows (left to right):

Row determinant places:

1, 2, 3
from the $k_1$ v $k_2$ "winners" determined in accord with Table 2, by such winners which were determined to be octuple members j1, j2, j3 of the winner. Presence of a 1 in a place of the row determinant corresponds to use of the row from the modified matrix in the mod 2 sum to determine the pattern vector.

4,5,6
by the column in table 3, containing the "winner of 128", the presence of absence of rows 4,5 and 6 in the modified matrix and corresponding places in the row determinant being represented by the binary digits corresponding to the first octal number in the bits column in the order 6,5,4.

7,8,9
by the choice of the row (mod 8) in the "best of 128" choice. The presence or absence of rows 7,8 or 9 in the modified matrix and corresponding places in the row determinant being represented by the binary digits corresponding to the third octal digit of the bits column in the order 9,8,7.

10,11,12
by the second octal digit in the bits column of the "best in 128" choice representing which set of sets of eight rows which octal digit when written in a binary form represents the presence or absence of rows 10,11,12 in the modified matrix and corresponding places in the row determinant being represented by the binary digits corresponding to the second octal digit of the bits column in the order 12,11,10.

Even or Odd
by the choice of 0 or 1 at the beginning of the "best of 128" competition.

When the detection algorithm is set out hereafter, subscripts are not used so that $M_{n,k}, P_{n,k}$ and $B_{n,k}$ etc. become M(n,k) P(n,k) and B(n,k) etc.

The determination of the pattern vector corresponds to step 5 of the detect algorithm. As steps 6–8, the row determinant represented by the first twelve places of C is used to determine the pattern vector which is used (steps 7 or 8) to modify the detected coordinates (full not mod values) to reverse the modification in accord with the same pattern vector at the encoder. Step 9 alter stored coordinate value corresponding to a flipped coordinate.

The discussion to follow corresponds to the decoding algorithm to follow.

In the decoding algorithm the 1D Z lattice points S1(1), R1(1); S1(2) R1(2) ... S1(24) R1(24) are combined by the combining algorithms to determine the encoded number Z. The combining algorithm reverses each of the steps of the splitting algorithm. The combining algorithm is further used to reverse the dimensional steps represented by the tree of FIG. 2 to produce the value D,S24 from the 24 S1, R1 values.

With regard to the combining algorithm, it will be noted that in the splitting algorithm (dimension H=dimensions F+G) entries for $$\sum_{i=0}^{k} I_i \times J_{n-i}$$

(n is the shell of H while I and J are the entries for the corresponding shell no), were performed with successive subtractions from $X_H$ until $I_k \times J_{n-k}$ > last X. The entry for $I_k$ was then divided into the last X to produce quotient Q and remainder R.

In the exact converse, in the combining algorithm, $I_k$ is multiplied by the quotient Q and R is added to produce the "last X" of the splitting algorithm. The first X of the splitting algorithm is provided from the last X in the combination algorithm by adding the products of the entries for $I_{k-i} \times J_{n-k+1}$ until k−i=0. The result of the combining algorithm is to produce the number $X_H$ and the shell number in dimension H having started with two pairs of values $X_F$ and shell no in dimension F and, $X_G$ and shell no in dimension G.

It will readily be appreciated that at step 25 of the decoding algorithm the shell number gives the offset value for addition to D, to give the encoded sum Z. Z is multiplied by 8192 reversing the division at the encoder. When C is to be added, it will be noted that the value C was obtained by the micrprocessor 90 from register 15.

The value N is then transmitted as b bits from microprocessor 90 to parallel to series convertor 100 were it is converted to serial binary bits. Assuming that scrambling was performed at scrambler 15 than the serial binary bits are unscrambled at uncrambler 95 into unscrambled serial binary bits of serial binary data.

In considering the encoding, detection and decoding algorithms the following points should be noted.

Although the algorithms give only one tabulation of the pattern matrix the offset table and tables Z1–Z12; it will be obvious that such tables exist both in the microprocessor 20 at the transmitter end of the channel for use with the encoding algorithm and in the microprocessor 90 at the receiver end of the channel for use with decoding algorithm.

$X_{24}$ identifies a message point or a shell in 24 dimensions. $X_{24}$ corresponds to D in step 3 of the encoding algorithm and step 24 of the decoding algorithm.

The encoding, detection and decoding algorithms are set out below:

ENCODING ALGORITHM

At a data rate of 19,200 bits per second, the data to be transmitted in one frame consists of 96 bits which may be considered as a number, N, in the range from 0 to 79,228,162,514,264,337,593,543,950,335. If an auxillary 200 bps channel is desired, the number of bits is increased to 97 so that N is from 0 to 158,456,325,028,528,675,187,087,900,671. At 16,800 bits per second with an auxillary channel, only 85 bits are required which may be considered as a number, N, in the range from 0 to 38,685,626,227,668,133,590,597,631. Similarly, at 14,400 bits per second, only 73 bits are required which may be considered as a number, N, in the range from 0 to 9,444,732,965,739,290,427,391. The number, N, may be converted to a group of 24 coordinates to be transmitted by the following algorithm.

Step 1: Divide N by 8192. Let the quotient be M and the remainder be C. M will now be encoded into a point in the Z lattice and C will be used to select a coset point.

Step 2: Scan the offset table (table 1) to find the entry for which the value in the offset column is as large as possible but does not exceed M. Let S be the corresponding shell number.

Step 3: Subtract the value in the offset column from Z giving a difference D. So far we have selected a shell corresponding to the table entry and we will use the value of D to select a message point from within this shell.

Step 4: Set X=D and J=S. Then use the splitting algorithm (described later) with Table A=table Z12 and Table B=table Z12. Let S12A=I, S12G=J, R12A=R and R12G=Q Step 5: Set X=R12A and J=S12A. Then use the splitting algorithm with Table A=table Z6 and Table B=table Z6. Let S6A=I, S6D=J, R6A=R and R6D=Q Step 6: Set X=R12G and J=S12G. Then use the splitting algorithm with Table A=table Z6 and Table B=table Z6. Let S6G=I, S6K=J, R6G=R and R6K=Q Step 7: Set X=R6A and J=S6A. Then use the splitting algorithm with Table A=table Z2 and Table B=table Z4. Let S2A=I, S4B=J, R2A=R and R4B=Q Step 8: Set X=R4B and J=S4B. Then use the splitting algorithm with Table A=table Z2 and Table B=table Z2. Let S2B=I, S2C=J, R2B=R and R2C=Q Step 9: Set X=R6D and J=S6D. Then use the splitting algorithm with Table A=table Z2 and Table B=table Z4. Let S2D=I, S4E=J, R2D=R and R4E=Q Step 10: Set X=R4E and J=S4E. Then use the splitting algorithm with Table A=table Z2 and Table B=table Z2. Let S2E=I, S2F=J, R2E=R and R2F=Q Step 11: Set X=R6G and J=S6G. Then use the splitting algorithm with Table A=table Z2 and Table B=table Z4. Let S2G=I, S4H=J, R2G=R and R4H=Q Step 12: Set X=R4H and J=S4H. Then use the splitting algorithm with Table A=table Z2 and Table B=table Z2. Let S2H=I, S2J=J, R2H=R and R2J=Q Step 13: Set X=R6K and J=S6K. Then use the splitting algorithm with Table A=table Z2 and Table B=table Z4. Let S2K=I, S4L=J, R2K=R and R4L=Q Step 14: Set X=R4L and J=S4L. Then use the splitting algorithm with Table A=table Z2 and Table B=table Z2. Let S2L=I, S2M=J, R2L=R and R2M=Q Step 15: Set X=R2A and J=S2A. Then use the splitting algorithm with Table A=table Z1 and Table B=table Z1. Let S1(1)=I, S1(2)=J, R1(1)=R and R1(2)=Q Step 16: Set X=R2B and J=S2B. Then use the splitting algorithm with Table A=table Z1 and Table B=table Z1. Let S1(3)=I, S1(4)=J, R1(3)=R and R1(4)=Q Step 17: Set X=R2C and J=S2C. Then use the splitting algorithm with Table A=table Z1 and Table B=table Z1. Let S1(5)=I, S1(6)=J, R1(5)=R and R1(6)=Q Step 18: Set X=R2D and J=S2D. Then use the splitting algorithm with Table A=table Z1 and Table B=table Z1. Let S1(7)=I, S1(8)=J, R1(7)=R and R1(8)=Q Step 19: Set X=R2E and J=S2E. Then use the splitting algorithm with Table A=table Z1 and Table B=table Z1. Let S1(9)=I, S1(10)=J, R1(9)=R and R1(10)=Q Step 20: Set X=R2F and J=S2F. Then use the splitting algorithm with Table A=table Z1 and Table B=table Z1. Let S1(11)=I, S1(12)=J, R1(11)=R and R1(12)=Q Step 21: Set X=R2G and J=S2G. Then use the splitting algorithm with Table A=table Z1 and Table B=table Z1. Let S1(13)=I, S1(14)=J, R1(13)=R and R1(14)=Q Step 22: Set X=R2H and J=S2H. Then use the splitting algorithm with Table A=table Z1 and Table B=table Z1. Let S1(15)=I, S1(16)=J, R1(15)=R and R1(16)=Q Step 23: Set X=R2J and J=S2J. Then use the splitting algorithm with Table A=table Z1 and Table B=table Z1. Let S1(17)=I, S1(18)=J, R1(17)=R and R1(18)=Q Step 24: Set X=R2K and J=S2K. Then use the splitting algorithm with Table A=table Z1 and Table B=table Z1. Let S1(19)=I, S1(20)=J, R1(19)=R and R1(20)=Q Step 25: Set X=R2L and J=S2L. Then use the splitting algorithm with Table A=table Z1 and Table B=table Z1. Let S1(21)=I, S1(22)=J, R1(21)=R and R1(22)=Q Step 26: Set X=R2M and J=S2M. Then use the splitting algorithm with Table A=table Z1 and Table B=table Z1. Let S1(23)=I, S1(24)=J, R1(23)=R and R1(24)=Q Step 27: Generate the 24 coordinates of the Z lattice point from S1(1) to S1(24) and R1(1) to R(1)24. Each coordinate is 4 times the square root of the corresponding S1(N). If R(1)n=1, the sign of the coordinate is to be made negative.

Step 28: The 12 high order bits of the 13 bit binary representation of C are associated with the twelve rows of the pattern matrix with the most significant bit associated with the first row. The 12 high order bits of C constitute the row determinant.

Step 29: Exclusive or together those rows of the matrix for which the associated bit of C is a one to produce a "pattern vector" of 24 bits.

Step 30: If C is even, add 2 to each Z lattice point coordinate for which the corresponding pattern vector bit is a one.

Step 31: If C is odd, subtract 3 from the first Z lattice point coordinate if the first bit of the pattern vector is a zero or add 3 if it is a one. For the remaining 23 Z lattice point coordinates, add 1 if the corresponding pattern bit is a zero or subtract one if it is a one.

(Coordinates C1, C2 ... C24 have now been produced with step 30 or 31.)

Step 32: Subtract $\frac{1}{2}$ from each coordinate to remove the statistical bias introduced in step 30. The coordinates are now ready for transmission.

The splitting algorithm invoked above is as follows:

Step 1: Set I=0.

Step 2: Multiply entry I of table A by entry J of table B to produce a product, P.

Step 3: If P is less than or equal to X, Subtract P from X (the difference is a new X). Add 1 to I, Subtract 1 from J and return to step 2. If P is greater than X, continue to step 4.

Step 4: Divide last X by last entry I of table A to produce a quotient, Q and a remainder R. The splitting algorithm is now complete.

DETECTION ALGORITHM

The detection algorithm proceeds as follows:

Step 1: Add $\frac{1}{2}$ to each coordinate to compensate for the subtraction performed in the transmitter.

Step 2: For each of the 24 coordinates, C(n), (n=1 to 24) compute M(n,k), P(n,k) and B(n,k) (k=0 to 3) as specified by the table 1 where X(n) is the coordinate, C(n), modulo 4, I(n) is the integer part of X(n) and F(n) is its fractional part. If C(n) mod 8 is not equal to X(n), the values of B(n,k) must be complemented. For computational convenience, the single bit value of B(n,k) can be kept in the low order bit of M(n,k) thus automatically performing the sums modulo 2 whenever the corresponding Ms are added. Carries out of the B bit slightly contaminate the M values but provided that sufficient precision is used this is unimportant.

Note that two alternative formulae are given for M(n,k). The second is equal to the first $+1-F(n)**2$ and avoids the squaring. Either may be used throughout.

Step 3: Now divide the coordinates into 3 groups of 8 (g=1 to 3) where 1 to 8 form group 1, 9 to 16 form group 2 and 17 to 24 form group 3.

Compute GM(g,j), GP(g,j) GB(g,j) RN(g,j) RF(g,j) for the 128 values of j (which for convenience are numbered in octal notation from 000 to 177) and for each group of coordinates g in accordance with table 2 as follows:

For each j, the 8 digits from column k1 or k2 of table 2 define values of k for the eight coordinates. Compute temporary variable SUM1 as the sum of the selected values of M(n,k), PEN1 as the smallest of the selected values of P(n,k) and BIT1 as the sum modulo 2 of the selected values of B(n,j) using column k1 to select the values of k. Compute SUM2, PEN2 and BIT2 in the same way using column k2.

If SUM1 is less than SUM2, set GMg, j=SUM1, set GB(g,j)=BIT1 and set RN(g,j)=0; otherwise set GM(g,j)=SUM2, set GB(g,j)=BIT2 and set RN(g,j)=1.

Now set PEN1=PEN1+SUM1−GM(g,j) and PEN2=PEN2+SUM2−GM(g,j) (Note the one of SUM1−GM(g,j) or SUM2−GM(g,j) must be zero)

If PEN1 is less than PEN2, set GP(g,j)=PEN1 and set RF(g,j)=0 otherwise set GP(g,j)=PEN2 and set RF(g,j)=1.

If BIT1 is the same as BIT2, The rest of this paragraph is ignored. Otherwise compute TEMP=the absolute value of the difference between SUM1 and SUM2 and compare this with GP(g,j) as computed above. If TEMP is smaller, replace GP(g,j) with TEMP and replace RF(g,j) with RN(g,j)+1 (modulo 2). Any GP(g,j) replaced in this way should be marked as "special"

Note that the number of actual computation steps may be reduced at the expense of some complexity by first computing values for each of four coordinate pairs, combining the into values for each of two coordinate 4-tuples and finally computing the values required.

Note also that the computation of RN and RF may be omitted at this stage and computed only after the final winner is known at the end of step 4.

Step 4: Each row of table 3 contains a value of j3 followed by eight entries each giving a value of j1, j2 and a 9 bit octal value headed "bits". Consider table 3 to be doubled in size with a leading 0 appended to each of the values of j in the first (even) half and with a leading 1 appended to each of the values of j in the second (odd) half.

For each of the 8 entries within a row sum GM(1,j1) and GM(2,j2). If the sum modulo 2 of GB(1,j1), GB(2,j2) and GB(3,j3) is 1 for an even row or 0 for an odd row add the smallest of GP(1,j1), GP(2,j2) and GP(3,j3) to the above sum. Select the smallest of the 8 sums and add GM(3,j3) to get the "winner" of this row.

The smallest of the 128 row winners identifies the final result. If the winning sum did not include a GP(g,j) term the output bits are RN(1,J1), RN(2,j2), RN(3,j3) followed by the nine bits from the "bits" column of the selected entry of the winning row followed by a 0 if the winner was even or a 1 if odd. If a GP(g,j) term was included in the winner, one of RF(1,j1), RF(2,j2) or RF(3,j3) must replace one of RN(1,j1), RN(2,j2) or RN(3,j3) depending on which of GP(1,j1), GP(2,j2) and GP(3,j3) was smallest. Of these 13 bits, the first 12 define the matrix rows used and the last defines odd/even. These 13 bits comprise the number C.

If a GP(g,j) term was included in the final winner, and it was not marked as "special" (see step 3), set FLIP=the number of the coordinate which contributed the smallest penalty, P. Otherwise set FLIP=0.

If the first $M_{n,k}$ column of table 1 was used. The smallest sum is the square of the distance to the nearest lattice point. If the second column was used it may be corrected if desired by adding the sum of the squares of the fractional parts of the coordinates and subtracting 24.

Note that it is not necessary to completely perform one step before commencing the next. Each group of eight entries of table 2 provide sufficient data to perform step 4 with 8 rows of table 3.

Step 5: The 12 high order bits of the 13 bit binary representation of C are associated with the twelve rows of the pattern matrix with the most significant bit associated with the first row. These 12 high order bits constitute the row determinant.

Step 6: Exclusive or together those rows of the matrix for which the associated bit of C is a one to produce a "pattern vector" of 24 bits.

Step 7: If C is even, subtract 2 from each detected coordinate C1, C2 ... C24 for which the corresponding pattern vector bit is a one.

Step 8: If C is odd, add 3 to the first detected coordinate C1 if the first bit of the pattern vector is a zero or subtract 3 if it is a one. For the remaining 23 detected coordinates C2, C3 ... C24, subtract 1 if the corresponding pattern bit is a zero or add 1 if it is a one.

Step 9: If FLIP=0, ignore this step. Otherwise the detected coordinate identified by FLIP must be increased by 4 if its integer part is 0 or 1 mod 4, or decreased by 4 if it is 2 or 3 mod 4.

Step 10: Round each coordinate to the nearest 0 mod 4 value. A coordinate which is exactly 2 mod 4 should be rounded up. The 24 coordinates are now those of the Z lattice point.

TABLE 1

DETECTION ALGORITHM

| In | k | M(n,k) | M(n,k) | P(n,k) | B(n,k) |
|----|---|--------|--------|--------|--------|
| 0 | 0 | X(n)**2 | 1 | 16−8X(n) | 0 |
| 1 | 0 | X(n)**2 | 2+2F(n) | 16−8X(n) | 0 |
| 2 | 0 | (X(n)−4)**2 | 5−4F(n) | 8X(n)−16 | 1 |
| 3 | 0 | (X(n)−4)**2 | 2−2F(n) | 8X(n)−16 | 1 |
| 0 | 1 | (X(n)−1)**2 | 2−2F(n) | 8+8X(n) | 0 |
| 1 | 1 | (X(n)−1)**2 | 1 | 24−8X(n) | 0 |
| 2 | 1 | (X(n)−1)**2 | 2+2F(n) | 24−8X(n) | 0 |
| 3 | 1 | (X(n)−5)**2 | 5−4F(n) | 8X(n)−24 | 1 |
| 0 | 2 | (X(n)−2)**2 | 5−4F(n) | 8X(n) | 0 |
| 1 | 2 | (X(n)−2)**2 | 2−2F(n) | 8X(n) | 0 |
| 2 | 2 | (X(n)−2)**2 | 1 | 32−8X(n) | 0 |
| 3 | 2 | (X(n)−2)**2 | 2+2F(n) | 32−8X(n) | 0 |
| 0 | 3 | (X(n)+1)**2 | 2+2F(n) | 8−8X(n) | 1 |
| 1 | 3 | (X(n)−3)**2 | 5−4F(n) | 8X(n)−8 | 0 |
| 2 | 3 | (X(n)−3)**2 | 2−2F(n) | 8X(n)−8 | 0 |
| 3 | 3 | (X(n)−3)**2 | 1 | 40−8X(n) | 0 |

TABLE 2

DETECTION ALGORITHM

| J | k1 | k2 | J | k1 | k2 | J | k1 | k2 | J | k1 | k2 |
|---|----|----|---|----|----|---|----|----|---|----|----|
| 000 | 00000000 | 22222222 | 040 | 02220200 | 20002022 | 100 | 11111111 | 33333333 | 140 | 13331311 | 31113133 |
| 001 | 00002222 | 22220000 | 041 | 02222022 | 20000200 | 101 | 11113333 | 33331111 | 141 | 13333133 | 31111311 |
| 002 | 00220022 | 22002200 | 042 | 02000222 | 20222000 | 102 | 11331133 | 33113311 | 142 | 13111333 | 31333111 |
| 003 | 00222200 | 22000022 | 043 | 02002000 | 20220222 | 103 | 11333311 | 33111133 | 143 | 13113111 | 31331333 |
| 004 | 02020202 | 20202020 | 044 | 00200002 | 22022220 | 104 | 13131313 | 31313131 | 144 | 11311113 | 33133331 |
| 005 | 02022020 | 20200202 | 045 | 00202220 | 22020002 | 105 | 13133131 | 31311313 | 145 | 11313331 | 33131113 |
| 006 | 02200220 | 20022002 | 046 | 00020020 | 22202202 | 106 | 13311331 | 31133113 | 146 | 11131131 | 33313313 |
| 007 | 02202002 | 20020220 | 047 | 00022202 | 22200020 | 107 | 13313113 | 31131331 | 147 | 11133313 | 33311131 |
| 010 | 02002202 | 20220020 | 050 | 00222002 | 22000220 | 110 | 13113313 | 31331131 | 150 | 11333113 | 33111331 |
| 011 | 02000020 | 20222202 | 051 | 00220220 | 22002002 | 111 | 13111131 | 31333313 | 151 | 11331331 | 33113113 |
| 012 | 02222220 | 20000002 | 052 | 00002022 | 22220200 | 112 | 13333331 | 31111113 | 152 | 11113131 | 33331313 |
| 013 | 02220002 | 20002220 | 053 | 00000202 | 22222020 | 113 | 13331113 | 31113331 | 153 | 11111313 | 33333131 |
| 014 | 00022000 | 22200222 | 054 | 02202200 | 20020022 | 114 | 11133111 | 33311333 | 154 | 13313311 | 31131133 |
| 015 | 00020222 | 22202000 | 055 | 02200022 | 20022200 | 115 | 11131333 | 33313111 | 155 | 13311133 | 31133311 |

TABLE 2-continued

DETECTION ALGORITHM

| J | k1 | k2 | J | k1 | k2 | J | k1 | k2 | J | k1 | k2 |
|---|---|---|---|---|---|---|---|---|---|---|---|
| 016 | 00202022 | 22020200 | 056 | 02022222 | 20200000 | 116 | 11313133 | 33131311 | 156 | 13133333 | 31311111 |
| 017 | 00200200 | 22022022 | 057 | 02020000 | 20200222 | 117 | 11311311 | 33133133 | 157 | 13131111 | 31313333 |
| 020 | 02020022 | 20202200 | 060 | 00200222 | 22022000 | 120 | 13131133 | 31313311 | 160 | 11311333 | 33133111 |
| 021 | 02022200 | 20200022 | 061 | 00202000 | 22020222 | 121 | 13133311 | 31311133 | 161 | 11313111 | 33131333 |
| 022 | 02200000 | 20022222 | 062 | 00020200 | 22202022 | 122 | 13311111 | 31133333 | 162 | 11131311 | 33313133 |
| 023 | 02202222 | 20020000 | 063 | 00022222 | 22200200 | 123 | 13313333 | 31131111 | 163 | 11133333 | 33311311 |
| 024 | 00000220 | 22222002 | 064 | 02220020 | 20002202 | 124 | 11111331 | 33333113 | 164 | 13331131 | 31113313 |
| 025 | 00002002 | 22220220 | 065 | 02222202 | 20000020 | 125 | 11113113 | 33331331 | 165 | 13333313 | 31111131 |
| 026 | 00220202 | 22002020 | 066 | 02000002 | 20222220 | 126 | 11331313 | 33113131 | 166 | 13111113 | 31333331 |
| 027 | 00222020 | 22000202 | 067 | 02002220 | 20220002 | 127 | 11333131 | 33111313 | 167 | 13113331 | 31331113 |
| 030 | 00022220 | 22200002 | 070 | 02202020 | 20020202 | 130 | 11133331 | 33311113 | 170 | 13313131 | 31131313 |
| 031 | 00020002 | 22202220 | 071 | 02200202 | 20022020 | 131 | 11131113 | 33313331 | 171 | 13311313 | 31133131 |
| 032 | 00202202 | 22020020 | 072 | 02022020 | 20200202 | 132 | 11313133 | 33131131 | 172 | 13133113 | 31311331 |
| 033 | 00200020 | 22022202 | 073 | 02020220 | 20202002 | 133 | 11311131 | 33133313 | 173 | 13131331 | 31313113 |
| 034 | 02002022 | 20220200 | 074 | 00222222 | 22000000 | 134 | 13113133 | 31331311 | 174 | 11333333 | 33111111 |
| 035 | 02000200 | 20222022 | 075 | 00220000 | 22002222 | 135 | 13111311 | 31333133 | 175 | 11331111 | 33113333 |
| 036 | 02222000 | 20000222 | 076 | 00002200 | 22220022 | 136 | 13333111 | 31111333 | 176 | 11113311 | 33331133 |
| 037 | 02220222 | 20002000 | 077 | 00000022 | 22222200 | 137 | 13331333 | 31113111 | 177 | 11111133 | 33333311 |

TABLE 3

DETECTION ALGORITHM

| j3 | j1 | j2 | bits | j1 | j2 | bits | j1 | j2 | bits | j1 | j2 | bits | j1 | j2 | bits | j1 | j2 | bits | j1 | j2 | bits | j1 | j2 | bits |
|---|---|---|---|---|---|---|---|---|---|---|---|---|---|---|---|---|---|---|---|---|---|---|---|---|
| 00 | 00 | 00 | 000 | 01 | 01 | 100 | 02 | 02 | 200 | 03 | 03 | 300 | 04 | 04 | 400 | 05 | 05 | 500 | 06 | 06 | 600 | 07 | 07 | 700 |
| 01 | 00 | 01 | 001 | 01 | 00 | 101 | 02 | 03 | 201 | 03 | 02 | 301 | 04 | 05 | 401 | 05 | 04 | 501 | 06 | 07 | 601 | 07 | 06 | 701 |
| 02 | 00 | 02 | 002 | 01 | 03 | 102 | 02 | 00 | 202 | 03 | 01 | 302 | 04 | 06 | 402 | 05 | 07 | 502 | 06 | 04 | 602 | 07 | 05 | 702 |
| 03 | 00 | 03 | 003 | 01 | 02 | 103 | 02 | 01 | 203 | 03 | 00 | 303 | 04 | 07 | 403 | 05 | 06 | 503 | 06 | 05 | 603 | 07 | 04 | 703 |
| 04 | 00 | 04 | 004 | 01 | 05 | 104 | 02 | 06 | 204 | 03 | 07 | 304 | 04 | 00 | 404 | 05 | 01 | 504 | 06 | 02 | 604 | 07 | 03 | 704 |
| 05 | 00 | 05 | 005 | 01 | 04 | 105 | 02 | 07 | 205 | 03 | 06 | 305 | 04 | 01 | 405 | 05 | 00 | 505 | 06 | 03 | 605 | 07 | 02 | 705 |
| 06 | 00 | 06 | 006 | 01 | 07 | 106 | 02 | 04 | 206 | 03 | 05 | 306 | 04 | 02 | 406 | 05 | 03 | 506 | 06 | 00 | 606 | 07 | 01 | 706 |
| 07 | 00 | 07 | 007 | 01 | 06 | 107 | 02 | 05 | 207 | 03 | 04 | 307 | 04 | 03 | 407 | 05 | 02 | 507 | 06 | 01 | 607 | 07 | 00 | 707 |
| 10 | 10 | 10 | 010 | 11 | 11 | 110 | 12 | 12 | 210 | 13 | 13 | 310 | 14 | 14 | 410 | 15 | 15 | 510 | 16 | 16 | 610 | 17 | 17 | 710 |
| 11 | 10 | 11 | 011 | 11 | 10 | 111 | 12 | 13 | 211 | 13 | 12 | 311 | 14 | 15 | 411 | 15 | 14 | 511 | 16 | 17 | 611 | 17 | 16 | 711 |
| 12 | 10 | 12 | 012 | 11 | 13 | 112 | 12 | 10 | 212 | 13 | 11 | 312 | 14 | 16 | 412 | 15 | 17 | 512 | 16 | 14 | 612 | 17 | 15 | 712 |
| 13 | 10 | 13 | 013 | 11 | 12 | 113 | 12 | 11 | 213 | 13 | 10 | 313 | 14 | 17 | 413 | 15 | 16 | 513 | 16 | 15 | 613 | 17 | 14 | 713 |
| 14 | 10 | 14 | 014 | 11 | 15 | 114 | 12 | 16 | 214 | 13 | 17 | 314 | 14 | 10 | 414 | 15 | 11 | 514 | 16 | 12 | 614 | 17 | 13 | 714 |
| 15 | 10 | 15 | 015 | 11 | 14 | 115 | 12 | 17 | 215 | 13 | 16 | 315 | 14 | 11 | 415 | 15 | 10 | 515 | 16 | 13 | 615 | 17 | 12 | 715 |
| 16 | 10 | 16 | 016 | 11 | 17 | 116 | 12 | 14 | 216 | 13 | 15 | 316 | 14 | 12 | 416 | 15 | 13 | 516 | 16 | 10 | 616 | 17 | 11 | 716 |
| 17 | 10 | 17 | 017 | 11 | 16 | 117 | 12 | 15 | 217 | 13 | 14 | 317 | 14 | 13 | 417 | 15 | 12 | 517 | 16 | 11 | 617 | 17 | 10 | 717 |
| 20 | 20 | 20 | 020 | 21 | 21 | 120 | 22 | 22 | 220 | 23 | 23 | 320 | 24 | 24 | 420 | 25 | 25 | 520 | 26 | 26 | 620 | 27 | 27 | 720 |
| 21 | 20 | 21 | 021 | 21 | 20 | 121 | 22 | 23 | 221 | 23 | 22 | 321 | 24 | 25 | 421 | 25 | 24 | 521 | 26 | 27 | 621 | 27 | 26 | 721 |
| 22 | 20 | 22 | 022 | 21 | 23 | 122 | 22 | 20 | 222 | 23 | 21 | 322 | 24 | 26 | 422 | 25 | 27 | 522 | 26 | 24 | 622 | 27 | 25 | 722 |
| 23 | 20 | 23 | 023 | 21 | 22 | 123 | 22 | 21 | 223 | 23 | 20 | 323 | 24 | 27 | 423 | 25 | 26 | 523 | 26 | 25 | 623 | 27 | 24 | 723 |
| 24 | 20 | 24 | 024 | 21 | 25 | 124 | 22 | 26 | 224 | 23 | 27 | 324 | 24 | 20 | 424 | 25 | 21 | 524 | 26 | 22 | 624 | 27 | 23 | 724 |
| 25 | 20 | 25 | 025 | 21 | 24 | 125 | 22 | 27 | 225 | 23 | 26 | 325 | 24 | 21 | 425 | 25 | 20 | 525 | 26 | 23 | 625 | 27 | 22 | 725 |
| 26 | 20 | 26 | 026 | 21 | 27 | 126 | 22 | 24 | 226 | 23 | 25 | 326 | 24 | 22 | 426 | 25 | 23 | 526 | 26 | 20 | 626 | 27 | 21 | 726 |
| 27 | 20 | 27 | 027 | 21 | 26 | 127 | 22 | 25 | 227 | 23 | 24 | 327 | 24 | 23 | 427 | 25 | 22 | 527 | 26 | 21 | 627 | 27 | 20 | 727 |
| 30 | 30 | 30 | 030 | 31 | 31 | 130 | 32 | 32 | 230 | 33 | 33 | 330 | 34 | 34 | 430 | 35 | 35 | 530 | 36 | 36 | 630 | 37 | 37 | 730 |
| 31 | 30 | 31 | 031 | 31 | 30 | 131 | 32 | 33 | 231 | 33 | 32 | 331 | 34 | 35 | 431 | 35 | 34 | 531 | 36 | 37 | 631 | 37 | 36 | 731 |
| 32 | 30 | 32 | 032 | 31 | 33 | 132 | 32 | 30 | 232 | 33 | 31 | 332 | 34 | 36 | 432 | 35 | 37 | 532 | 36 | 34 | 632 | 37 | 35 | 732 |
| 33 | 30 | 33 | 033 | 31 | 32 | 133 | 32 | 31 | 233 | 33 | 30 | 333 | 34 | 37 | 433 | 35 | 36 | 533 | 36 | 35 | 633 | 37 | 34 | 733 |
| 34 | 30 | 34 | 034 | 31 | 35 | 134 | 32 | 36 | 234 | 33 | 37 | 334 | 34 | 30 | 434 | 35 | 31 | 534 | 36 | 32 | 634 | 37 | 33 | 734 |
| 35 | 30 | 35 | 035 | 31 | 34 | 135 | 32 | 37 | 235 | 33 | 36 | 335 | 34 | 31 | 435 | 35 | 30 | 535 | 36 | 33 | 635 | 37 | 32 | 735 |
| 36 | 30 | 36 | 036 | 31 | 37 | 136 | 32 | 34 | 236 | 33 | 35 | 336 | 34 | 32 | 436 | 35 | 33 | 536 | 36 | 30 | 636 | 37 | 31 | 736 |
| 37 | 30 | 37 | 037 | 31 | 36 | 137 | 32 | 35 | 237 | 33 | 34 | 337 | 34 | 33 | 437 | 35 | 32 | 537 | 36 | 31 | 637 | 37 | 30 | 737 |
| 40 | 40 | 40 | 040 | 41 | 41 | 140 | 42 | 42 | 240 | 43 | 43 | 340 | 44 | 44 | 440 | 45 | 45 | 540 | 46 | 46 | 640 | 47 | 47 | 740 |
| 41 | 40 | 41 | 041 | 41 | 40 | 141 | 42 | 43 | 241 | 43 | 42 | 341 | 44 | 45 | 441 | 45 | 44 | 541 | 46 | 47 | 641 | 47 | 46 | 741 |
| 42 | 40 | 42 | 042 | 41 | 43 | 142 | 42 | 40 | 242 | 43 | 41 | 342 | 44 | 46 | 442 | 45 | 47 | 542 | 46 | 44 | 642 | 47 | 45 | 742 |
| 43 | 40 | 43 | 043 | 41 | 42 | 143 | 42 | 41 | 243 | 43 | 40 | 343 | 44 | 47 | 443 | 45 | 46 | 543 | 46 | 45 | 643 | 47 | 44 | 743 |
| 44 | 40 | 44 | 044 | 41 | 45 | 144 | 42 | 46 | 244 | 43 | 47 | 344 | 44 | 40 | 444 | 45 | 41 | 544 | 46 | 42 | 644 | 47 | 43 | 744 |
| 45 | 40 | 45 | 045 | 41 | 44 | 145 | 42 | 47 | 245 | 43 | 46 | 345 | 44 | 41 | 445 | 45 | 40 | 545 | 46 | 43 | 645 | 47 | 42 | 745 |
| 46 | 40 | 46 | 046 | 41 | 47 | 146 | 42 | 44 | 246 | 43 | 45 | 346 | 44 | 42 | 446 | 45 | 43 | 546 | 46 | 40 | 646 | 47 | 41 | 746 |
| 47 | 40 | 47 | 047 | 41 | 46 | 147 | 42 | 45 | 247 | 43 | 44 | 347 | 44 | 43 | 447 | 45 | 42 | 547 | 46 | 41 | 647 | 47 | 40 | 747 |
| 50 | 50 | 50 | 050 | 51 | 51 | 150 | 52 | 52 | 250 | 53 | 53 | 350 | 54 | 54 | 450 | 55 | 55 | 550 | 56 | 56 | 650 | 57 | 57 | 750 |
| 51 | 50 | 51 | 051 | 51 | 50 | 151 | 52 | 53 | 251 | 53 | 52 | 351 | 54 | 55 | 451 | 55 | 54 | 551 | 56 | 57 | 651 | 57 | 56 | 751 |
| 52 | 50 | 52 | 052 | 51 | 53 | 152 | 52 | 50 | 252 | 53 | 51 | 352 | 54 | 56 | 452 | 55 | 57 | 552 | 56 | 54 | 652 | 57 | 55 | 752 |
| 53 | 50 | 53 | 053 | 51 | 52 | 153 | 52 | 51 | 253 | 53 | 50 | 353 | 54 | 57 | 453 | 55 | 56 | 553 | 56 | 55 | 653 | 57 | 54 | 753 |
| 54 | 50 | 54 | 054 | 51 | 55 | 154 | 52 | 56 | 254 | 53 | 57 | 354 | 54 | 50 | 454 | 55 | 51 | 554 | 56 | 52 | 654 | 57 | 53 | 754 |
| 55 | 50 | 55 | 055 | 51 | 54 | 155 | 52 | 57 | 255 | 53 | 56 | 355 | 54 | 51 | 455 | 55 | 50 | 555 | 56 | 53 | 655 | 57 | 52 | 755 |
| 56 | 50 | 56 | 056 | 51 | 57 | 156 | 52 | 54 | 256 | 53 | 55 | 356 | 54 | 52 | 456 | 55 | 53 | 556 | 56 | 50 | 656 | 57 | 51 | 756 |
| 57 | 50 | 57 | 057 | 51 | 56 | 157 | 52 | 55 | 257 | 53 | 54 | 357 | 54 | 53 | 457 | 55 | 52 | 557 | 56 | 51 | 657 | 57 | 50 | 757 |
| 60 | 60 | 60 | 060 | 61 | 61 | 160 | 62 | 62 | 260 | 63 | 63 | 360 | 64 | 64 | 460 | 65 | 65 | 560 | 66 | 66 | 660 | 67 | 67 | 760 |
| 61 | 60 | 61 | 061 | 61 | 60 | 161 | 62 | 63 | 261 | 63 | 62 | 361 | 64 | 65 | 461 | 65 | 64 | 561 | 66 | 67 | 661 | 67 | 66 | 761 |
| 62 | 60 | 62 | 062 | 61 | 63 | 162 | 62 | 60 | 262 | 63 | 61 | 362 | 64 | 66 | 462 | 65 | 67 | 562 | 66 | 64 | 662 | 67 | 65 | 762 |
| 63 | 60 | 63 | 063 | 61 | 62 | 163 | 62 | 61 | 263 | 63 | 60 | 363 | 64 | 67 | 463 | 65 | 66 | 563 | 66 | 65 | 663 | 67 | 64 | 763 |
| 64 | 60 | 64 | 064 | 61 | 65 | 164 | 62 | 66 | 264 | 63 | 67 | 364 | 64 | 60 | 464 | 65 | 61 | 564 | 66 | 62 | 664 | 67 | 63 | 764 |
| 65 | 60 | 65 | 065 | 61 | 64 | 165 | 62 | 67 | 265 | 63 | 66 | 365 | 64 | 61 | 465 | 65 | 60 | 565 | 66 | 63 | 665 | 67 | 62 | 765 |
| 66 | 60 | 66 | 066 | 61 | 67 | 166 | 62 | 64 | 266 | 63 | 65 | 366 | 64 | 62 | 466 | 65 | 63 | 566 | 66 | 60 | 666 | 67 | 61 | 766 |

TABLE 3-continued
DETECTION ALGORITHM

| j3 | j1 | j2 | bits | j1 | j2 | bits | j1 | j2 | bits | j1 | j2 | bits | j1 | j2 | bits | j1 | j2 | bits | j1 | j2 | bits | j1 | j2 | bits |
|---|---|---|---|---|---|---|---|---|---|---|---|---|---|---|---|---|---|---|---|---|---|---|---|---|
| 67 | 60 | 67 | 067 | 61 | 66 | 167 | 62 | 65 | 267 | 63 | 64 | 367 | 64 | 63 | 467 | 65 | 62 | 567 | 66 | 61 | 667 | 67 | 60 | 767 |
| 70 | 70 | 70 | 070 | 71 | 71 | 170 | 72 | 72 | 270 | 73 | 73 | 370 | 74 | 74 | 470 | 75 | 75 | 570 | 76 | 76 | 670 | 77 | 77 | 770 |
| 71 | 70 | 71 | 071 | 71 | 70 | 171 | 72 | 73 | 271 | 73 | 72 | 371 | 74 | 75 | 471 | 75 | 74 | 571 | 76 | 77 | 671 | 77 | 76 | 771 |
| 72 | 70 | 72 | 072 | 71 | 73 | 172 | 72 | 70 | 272 | 73 | 71 | 372 | 74 | 76 | 472 | 75 | 77 | 572 | 76 | 74 | 672 | 77 | 75 | 772 |
| 73 | 70 | 73 | 073 | 71 | 72 | 173 | 72 | 71 | 273 | 73 | 70 | 373 | 74 | 77 | 473 | 75 | 76 | 573 | 76 | 75 | 673 | 77 | 74 | 773 |
| 74 | 70 | 74 | 074 | 71 | 75 | 174 | 72 | 76 | 274 | 73 | 77 | 374 | 74 | 70 | 474 | 75 | 71 | 574 | 76 | 72 | 674 | 77 | 73 | 774 |
| 75 | 70 | 75 | 075 | 71 | 74 | 175 | 72 | 77 | 275 | 73 | 76 | 375 | 74 | 71 | 475 | 75 | 70 | 575 | 76 | 73 | 675 | 77 | 72 | 775 |
| 76 | 70 | 76 | 076 | 71 | 77 | 176 | 72 | 74 | 276 | 73 | 75 | 376 | 74 | 72 | 476 | 75 | 73 | 576 | 76 | 70 | 676 | 77 | 71 | 776 |
| 77 | 70 | 77 | 077 | 71 | 76 | 177 | 72 | 75 | 277 | 73 | 74 | 377 | 74 | 73 | 477 | 75 | 72 | 577 | 76 | 71 | 677 | 77 | 70 | 777 |

DECODING ALGORITHM

Step 1: Generate S1(1) to S1(24) and R1(1) to R(1)24 from the 24 coordinates of the Z lattice point. Divide each coordinate by 4 and square the result to produce the corresponding S value. Set each R=0 if the corresponding coordinate is positive or zero and set R=1 if it is negative.

Step 2: Set I=S1(1), J=S1(2), R=R1(1) and Q=R(1)2. Then use the combining algorithm (described later) with Table A=table Z1 and Table B=table Z1. Let R2A=X and S2A=J Step 3: Set I=S1(3), J=S1(4), R=R(1)3 and Q=R(1)4. Then use the combining algorithm with Table A=table Z1 and Table B=table Z1. Let R2B=X and S2B=J Step 4: Set I=S1(5), J=S1(6), R=R(1)5 and Q=R1(6). Then use the combining algorithm with Table A=table Z1 and Table B=table Z1. Let R2C=X and S2C=J Step 5: Set I=S1(7), J=S1(8), R=R1(7) and Q=R1(8). Then use the combining algorithm with Table A=table Z1 and Table B=table Z1. Let R2D=X and S2D=J Step 6: Set I=S1(9), J=S1(10), R=R1(9) and Q=R1(10). Then use the combining algorithm with Table A=table Z1 and Table B=table Z1. Let R2E=X and S2E=J Step 7: Set I=S1(11), J=S1(12), R=R1(11) and Q=R1(12). Then use the combining algorithm with Table A=table Z1 and Table B=table Z1. Let R2F=X and S2F=J Step 8: Set I=S1(13), J=S1(14), R=R1(13) and Q=R1(14). Then use the combining algorithm with Table A=table Z1 and Table B=table Z1. Let R2G=X and S2G=J Step 9: Set I=S1(15), J=S1(16), R=R1(15) and Q=R1(16). Then use the combining algorithm with Table A=table Z1 and Table B=table Z1. Let R2H=X and S2H=J Step 10: Set I=S1(17), J=S1(18), R=R1(17) and Q=R1(18). Then use the combining algorithm with Table A=table Z1 and Table B=table Z1. Let R2J=X and S2J=J Step 11: Set I=S1(19), J=S1(20), R=R1(19) and Q=R1(20). Then use the combining algorithm with Table A=table Z1 and Table B=table Z1. Let R2K=X and S2K=J Step 12: Set I=S1(21), J=S1(22), R=R1(21) and Q=R1(22). Then use the combining algorithm with Table A=table Z1 and Table B=table Z1. Let R2L=X and S2L=J Step 13: Set I=S1(23), J=S1(24), R=R1(23) and Q=R1(24). Then use the combining algorithm with Table A=table Z1 and Table B=table Z1. Let R2M=X and S2M=J Step 14: Set I=S2B, J=S2C, R=R2B and Q=R2C. Then use the combining algorithm with Table A=table Z2 and Table B=table Z2. Let R4B=X and S4B=J.

Step 15: Set I=S2A, J=S4B, R=R2A and Q=R4B. Then use the combining algorithm with Table A=table Z2 and Table B=table Z4. Let R6A=X and S6A=J.

Step 16: Set I=S2E, J=S2F, R=R2E and Q=R2F. Then use the combining algorithm with Table A=table Z2 and Table B=table Z2. Let R4E=X and S4E=J.

Step 17: Set I=S2D, J=S4E, R=R2D and Q=R4E. Then use the combining algorithm with Table A=table Z2 and Table B=table Z4. Let R6D=X and S6D=J.

Step 18: Set I=S2H, J=S2J, R=R2H and Q=R2J. Then use the combining algorithm with Table A=table Z2 and Table B=table Z2. Let R4H=X and S4H=J.

Step 19: Set I=S2G, J=S4H, R=R2G and Q=R4H. Then use the combining algorithm with Table A=table Z2 and Table B=table Z4. Let R6G=X and S6G=J.

Step 20: Set I=S2L, J=S2M, R=R2L and Q=R2M. Then use the combining algorithm with Table A=table Z2 and Table B=table Z2. Let R4L=X and S4L=J.

Step 21: Set I=S2K, J=S4L, R=R2K and Q=R4L. Then use the combining algorithm with Table A=table Z2 and Table B=table Z4. Let R6K=X and S6K=J.

Step 22: Set I=S6A, J=S6D, R=R6A and Q=R6D. Then use the combining algorithm with Table A=table Z6 and Table B=table Z6. Let R12A=X and S12A=J.

Step 23: Set I=S6G, J=S6K, R=R6G and Q=R6K. Then use the combining algorithm with Table A=table Z6 and Table B=table Z6. Let R12G=X and S12G=J.

Step 24: Set I=S12A, J=S12G, R=R12A and Q=R12G. Then use the combining algorithm with Table A=table Z12 and Table B=table Z12. Let D=X and S=J.

Step 25: Scan the offset table (table 1) to find the entry for shell S. Add the value in the offset column to D giving a sum M.

Step 26: Multiply M by 8192 and add C. The result is the value of N.

The combining algorithm invoked above is as follows.

Step 1: Multiply Q by entry I of table A and add R to produce X.

Step 2: If I=0, the algorithm is complete. Otherwise subtract 1 from I, add 1 to J and then multiply entry I of table A by entry J of table B and add the product to X and repeat this step.

ENCODE, DECODE ALGORITHMS
Offset Table (table 1)

| Shell | Offset |
|---|---|
| 2 | 0 |
| 4 | 1,104 |
| 6 | 171,168 |
| 8 | 8,833,888 |
| 10 | 203,916,208 |
| 12 | 2,523,373,840 |
| 14 | 19,754,483,664 |
| 16 | 113,458,073,424 |
| 18 | 520,946,091,936 |
| 20 | 2,008,233,058,864 |
| 22 | 6,753,012,488,080 |
| 24 | 20,276,772,491,728 |
| 26 | 55,527,493,578,896 |
| 28 | 140,471,654,812,016 |
| 30 | 332,599,107,074,288 |
| 32 | 742,583,618,782,064 |
| 34 | 1,577,241,826,163,648 |
| 36 | 3,201,652,977,773,408 |
| 38 | 6,250,829,856,860,656 |
| 40 | 11,772,243,378,517,936 |
| 42 | 21,488,816,280,661,264 |
| 44 | 38,091,349,398,269,712 |
| 46 | 65,813,944,996,460,880 |
| 48 | 110,975,216,780,648,400 |
| 50 | 183,170,699,359,583,888 |
| 52 | 296,176,250,747,821,760 |
| 54 | 470,313,032,057,139,104 |
| 56 | 733,802,649,961,852,704 |
| 58 | 1,127,282,425,012,264,608 |
| 60 | 1,705,562,004,748,326,528 |
| 62 | 2,546,027,906,352,742,656 |
| 64 | 3,750,338,176,583,741,184 |
| 66 | 5,459,698,938,503,358,288 |
| 68 | 7,855,306,052,010,638,928 |
| 70 | 11,185,364,161,430,427,120 |
| 72 | 15,761,598,618,153,912,048 |
| 74 | 22,006,333,253,178,287,488 |
| 76 | 30,439,267,863,141,761,248 |
| 78 | 41,758,145,964,051,168,928 |
| 80 | 56,805,942,222,418,254,624 |
| 82 | 76,705,521,974,670,315,648 |
| 84 | 102,790,003,409,884,499,616 |
| 86 | 136,825,213,243,612,237,984 |
| 88 | 180,871,853,681,611,950,304 |
| 90 | 237,647,674,612,416,058,144 |
| 92 | 310,274,972,509,704,813,568 |
| 94 | 402,855,562,706,550,178,432 |
| 96 | 520,030,903,624,780,216,192 |
| 98 | 667,887,282,878,315,058,752 |
| 100 | 853,204,877,392,029,630,224 |
| 102 | 1,084,866,366,316,724,513,600 |
| 104 | 1,372,628,843,781,043,137,728 |
| 106 | 1,729,261,230,348,138,347,936 |
| 108 | 2,168,594,752,191,117,510,656 |
| 110 | 2,708,748,750,998,791,808,896 |
| 112 | 3,369,061,029,531,845,159,680 |
| 114 | 4,174,907,475,749,930,441,344 |
| 116 | 5,153,012,845,572,620,444,544 |
| 118 | 6,338,485,997,759,954,228,064 |
| 120 | 7,767,814,007,243,823,839,904 |
| 122 | 9,489,088,807,416,724,301,088 |
| 124 | 11,551,560,348,210,870,663,936 |
| 126 | 14,020,397,101,121,777,789,184 |
| 128 | 16,961,486,827,188,962,520,704 |
| 130 | 20,462,257,878,140,766,824,144 |
| 132 | 24,609,951,889,446,752,483,600 |
| 134 | 29,520,947,360,446,140,239,888 |
| 136 | 35,309,668,202,124,931,709,648 |
| 138 | 42,129,631,517,897,299,694,192 |
| 140 | 50,129,857,007,333,339,232,368 |
| 142 | 59,511,140,048,476,876,253,552 |
| 144 | 70,465,868,440,255,241,753,840 |
| 146 | 83,255,084,071,227,534,308,224 |
| 148 | 98,125,093,343,012,843,683,744 |
| 150 | 115,412,613,794,490,713,387,776 |
| 152 | 135,431,325,977,840,557,716,032 |
| 154 | 158,612,397,740,580,988,792,832 |
| 156 | 185,352,173,129,019,034,813,952 |
| 158 | 216,200,163,114,557,452,649,088 |
| 160 | 251,653,554,301,571,825,870,208 |
| 162 | 292,407,894,227,049,291,537,120 |
| 164 | 339,084,303,287,704,694,137,264 |
| 166 | 392,557,502,327,740,879,513,552 |
| 168 | 453,598,102,325,630,140,035,472 |
| 170 | 523,302,245,924,753,258,804,112 |
| 172 | 602,619,554,566,350,712,176,720 |
| 174 | 692,915,189,017,751,886,612,624 |
| 176 | 795,356,236,008,523,094,321,424 |
| 178 | 911,633,121,557,068,121,682,768 |
| 180 | 1,043,170,702,590,018,684,540,528 |
| 182 | 1,192,056,699,908,246,215,817,040 |
| 184 | 1,360,020,268,709,003,330,894,928 |
| 186 | 1,549,625,404,920,394,770,580,176 |
| 188 | 1,762,966,570,548,122,052,971,216 |
| 190 | 2,003,176,071,047,978,658,185,168 |
| 192 | 2,272,775,796,193,092,396,592,208 |
| 194 | 2,575,585,656,054,138,708,462,352 |
| 196 | 2,914,624,028,838,764,473,032,112 |
| 198 | 3,294,525,191,675,170,663,348,864 |
| 200 | 3,718,899,779,744,493,071,204,800 |
| 202 | 4,193,342,739,035,337,171,766,768 |
| 204 | 4,722,146,931,451,409,521,239,376 |
| 206 | 5,312,060,154,473,602,161,379,024 |
| 208 | 5,968,158,963,699,136,006,897,744 |
| 210 | 6,698,542,086,960,014,568,788,272 |
| 212 | 7,509,212,883,615,628,699,979,056 |
| 214 | 8,409,846,821,357,616,140,398,480 |
| 216 | 9,407,504,001,506,860,931,212,240 |
| 218 | 10,513,739,929,400,091,829,175,120 |
| 220 | 11,736,809,764,883,851,223,578,160 |
| 222 | 13,090,450,253,047,376,115,538,352 |
| 224 | 14,584,327,787,390,434,105,633,840 |
| 226 | 16,234,701,307,190,010,119,347,120 |
| 228 | 18,052,821,776,055,874,414,204,240 |

TABLE Z1

| | | | | | | | | | |
|---|---|---|---|---|---|---|---|---|---|
| 0 | 1 | 46 | 0 | 92 | 0 | 138 | 0 | 184 | 0 |
| 1 | 2 | 47 | 0 | 93 | 0 | 139 | 0 | 185 | 0 |
| 2 | 0 | 48 | 0 | 94 | 0 | 140 | 0 | 186 | 0 |
| 3 | 0 | 49 | 2 | 95 | 0 | 141 | 0 | 187 | 0 |
| 4 | 2 | 50 | 0 | 96 | 0 | 142 | 0 | 188 | 0 |
| 5 | 0 | 51 | 0 | 97 | 0 | 143 | 0 | 189 | 0 |
| 6 | 0 | 52 | 0 | 98 | 0 | 144 | 2 | 190 | 0 |
| 7 | 0 | 53 | 0 | 99 | 0 | 145 | 0 | 191 | 0 |
| 8 | 0 | 54 | 0 | 100 | 2 | 146 | 0 | 192 | 0 |
| 9 | 2 | 55 | 0 | 101 | 0 | 147 | 0 | 193 | 0 |
| 10 | 0 | 56 | 0 | 102 | 0 | 148 | 0 | 194 | 0 |
| 11 | 0 | 57 | 0 | 103 | 0 | 149 | 0 | 195 | 0 |
| 12 | 0 | 58 | 0 | 104 | 0 | 150 | 0 | 196 | 2 |
| 13 | 0 | 59 | 0 | 105 | 0 | 151 | 0 | 197 | 0 |
| 14 | 0 | 60 | 0 | 106 | 0 | 152 | 0 | 198 | 0 |
| 15 | 0 | 61 | 0 | 107 | 0 | 153 | 0 | 199 | 0 |
| 16 | 2 | 62 | 0 | 108 | 0 | 154 | 0 | 200 | 0 |
| 17 | 0 | 63 | 0 | 109 | 0 | 155 | 0 | 201 | 0 |
| 18 | 0 | 64 | 2 | 110 | 0 | 156 | 0 | 202 | 0 |
| 19 | 0 | 65 | 0 | 111 | 0 | 157 | 0 | 203 | 0 |
| 20 | 0 | 66 | 0 | 112 | 0 | 158 | 0 | 204 | 0 |
| 21 | 0 | 67 | 0 | 113 | 0 | 159 | 0 | 205 | 0 |
| 22 | 0 | 68 | 0 | 114 | 0 | 160 | 0 | 206 | 0 |
| 23 | 0 | 69 | 0 | 115 | 0 | 161 | 0 | 207 | 0 |
| 24 | 0 | 70 | 0 | 116 | 0 | 162 | 0 | 208 | 0 |
| 25 | 2 | 71 | 0 | 117 | 0 | 163 | 0 | 209 | 0 |
| 26 | 0 | 72 | 0 | 118 | 0 | 164 | 0 | 210 | 0 |
| 27 | 0 | 73 | 0 | 119 | 0 | 165 | 0 | 211 | 0 |
| 28 | 0 | 74 | 0 | 120 | 0 | 166 | 0 | 212 | 0 |
| 29 | 0 | 75 | 0 | 121 | 2 | 167 | 0 | 213 | 0 |
| 30 | 0 | 76 | 0 | 122 | 0 | 168 | 0 | 214 | 0 |
| 31 | 0 | 77 | 0 | 123 | 0 | 169 | 2 | 215 | 0 |
| 32 | 0 | 78 | 0 | 124 | 0 | 170 | 0 | 216 | 0 |
| 33 | 0 | 79 | 0 | 125 | 0 | 171 | 0 | 217 | 0 |
| 34 | 0 | 80 | 0 | 126 | 0 | 172 | 0 | 218 | 0 |
| 35 | 0 | 81 | 2 | 127 | 0 | 173 | 0 | 219 | 0 |

TABLE Z1-continued

| | | | | | | | | | |
|---|---|---|---|---|---|---|---|---|---|
| 36 | 2 | 82 | 0 | 128 | 0 | 174 | 0 | 220 | 0 |
| 37 | 0 | 83 | 0 | 129 | 0 | 175 | 0 | 221 | 0 |
| 38 | 0 | 84 | 0 | 130 | 0 | 176 | 0 | 222 | 0 |
| 39 | 0 | 85 | 0 | 131 | 0 | 177 | 0 | 223 | 0 |
| 40 | 0 | 86 | 0 | 132 | 0 | 178 | 0 | 224 | 0 |
| 41 | 0 | 87 | 0 | 133 | 0 | 179 | 0 | 225 | 2 |
| 42 | 0 | 88 | 0 | 134 | 0 | 180 | 0 | 226 | 0 |
| 43 | 0 | 89 | 0 | 135 | 0 | 181 | 0 | 227 | 0 |
| 44 | 0 | 90 | 0 | 136 | 0 | 182 | 0 | 228 | 0 |
| 45 | 0 | 91 | 0 | 137 | 0 | 183 | 0 | | |

TABLE Z2

| | | | | | | | | | |
|---|---|---|---|---|---|---|---|---|---|
| 0 | 1 | 46 | 0 | 92 | 0 | 138 | 0 | 184 | 0 |
| 1 | 4 | 47 | 0 | 93 | 0 | 139 | 0 | 185 | 16 |
| 2 | 4 | 48 | 0 | 94 | 0 | 140 | 0 | 186 | 0 |
| 3 | 0 | 49 | 4 | 95 | 0 | 141 | 0 | 187 | 0 |
| 4 | 4 | 50 | 12 | 96 | 0 | 142 | 0 | 188 | 0 |
| 5 | 8 | 51 | 0 | 97 | 8 | 143 | 0 | 189 | 0 |
| 6 | 0 | 52 | 8 | 98 | 4 | 144 | 4 | 190 | 0 |
| 7 | 0 | 53 | 8 | 99 | 0 | 145 | 16 | 191 | 0 |
| 8 | 4 | 54 | 0 | 100 | 12 | 146 | 8 | 192 | 0 |
| 9 | 4 | 55 | 0 | 101 | 8 | 147 | 0 | 193 | 8 |
| 10 | 8 | 56 | 0 | 102 | 0 | 148 | 8 | 194 | 8 |
| 11 | 0 | 57 | 0 | 103 | 0 | 149 | 8 | 195 | 0 |
| 12 | 0 | 58 | 8 | 104 | 8 | 150 | 0 | 196 | 4 |
| 13 | 8 | 59 | 0 | 105 | 0 | 151 | 0 | 197 | 8 |
| 14 | 0 | 60 | 0 | 106 | 8 | 152 | 0 | 198 | 0 |
| 15 | 0 | 61 | 8 | 107 | 0 | 153 | 8 | 199 | 0 |
| 16 | 4 | 62 | 0 | 108 | 0 | 154 | 0 | 200 | 12 |
| 17 | 8 | 63 | 0 | 109 | 8 | 155 | 0 | 201 | 0 |
| 18 | 4 | 64 | 4 | 110 | 0 | 156 | 0 | 202 | 8 |
| 19 | 0 | 65 | 16 | 111 | 0 | 157 | 8 | 203 | 0 |
| 20 | 8 | 66 | 0 | 112 | 0 | 158 | 0 | 204 | 0 |
| 21 | 0 | 67 | 0 | 113 | 8 | 159 | 0 | 205 | 16 |
| 22 | 0 | 68 | 8 | 114 | 0 | 160 | 8 | 206 | 0 |
| 23 | 0 | 69 | 0 | 115 | 0 | 161 | 0 | 207 | 0 |
| 24 | 0 | 70 | 0 | 116 | 8 | 162 | 4 | 208 | 8 |
| 25 | 12 | 71 | 0 | 117 | 8 | 163 | 0 | 209 | 0 |
| 26 | 8 | 72 | 4 | 118 | 0 | 164 | 8 | 210 | 0 |
| 27 | 0 | 73 | 8 | 119 | 0 | 165 | 0 | 211 | 0 |
| 28 | 0 | 74 | 8 | 120 | 0 | 166 | 0 | 212 | 8 |
| 29 | 8 | 75 | 0 | 121 | 4 | 167 | 0 | 213 | 0 |
| 30 | 0 | 76 | 0 | 122 | 8 | 168 | 0 | 214 | 0 |
| 31 | 0 | 77 | 0 | 123 | 0 | 169 | 12 | 215 | 0 |
| 32 | 4 | 78 | 0 | 124 | 0 | 170 | 16 | 216 | 0 |
| 33 | 0 | 79 | 0 | 125 | 16 | 171 | 0 | 217 | 0 |
| 34 | 8 | 80 | 8 | 126 | 0 | 172 | 0 | 218 | 8 |
| 35 | 0 | 81 | 4 | 127 | 0 | 173 | 8 | 219 | 0 |
| 36 | 4 | 82 | 8 | 128 | 4 | 174 | 0 | 220 | 0 |
| 37 | 8 | 83 | 0 | 129 | 0 | 175 | 0 | 221 | 16 |
| 38 | 0 | 84 | 0 | 130 | 16 | 176 | 0 | 222 | 0 |
| 39 | 0 | 85 | 16 | 131 | 0 | 177 | 0 | 223 | 0 |
| 40 | 8 | 86 | 0 | 132 | 0 | 178 | 8 | 224 | 0 |
| 41 | 8 | 87 | 0 | 133 | 0 | 179 | 0 | 225 | 12 |
| 42 | 0 | 88 | 0 | 134 | 0 | 180 | 8 | 226 | 8 |
| 43 | 0 | 89 | 8 | 135 | 0 | 181 | 8 | 227 | 0 |
| 44 | 0 | 90 | 8 | 136 | 8 | 182 | 0 | 228 | 0 |
| 45 | 8 | 91 | 0 | 137 | 8 | 183 | 0 | | |

TABLE Z4

| | | | | | | | | | |
|---|---|---|---|---|---|---|---|---|---|
| 0 | 1 | 58 | 720 | 116 | 720 | 174 | 2,880 | | |
| 1 | 8 | 59 | 480 | 117 | 1,456 | 175 | 1,984 | | |
| 2 | 24 | 60 | 576 | 118 | 1,440 | 176 | 288 | | |
| 3 | 32 | 61 | 496 | 119 | 1,152 | 177 | 1,920 | | |
| 4 | 24 | 62 | 768 | 120 | 576 | 178 | 2,160 | | |
| 5 | 48 | 63 | 832 | 121 | 1,064 | 179 | 1,440 | | |
| 6 | 96 | 64 | 24 | 122 | 1,488 | 180 | 1,872 | | |
| 7 | 64 | 65 | 672 | 123 | 1,344 | 181 | 1,456 | | |
| 8 | 24 | 66 | 1,152 | 124 | 768 | 182 | 2,688 | | |
| 9 | 104 | 67 | 544 | 125 | 1,248 | 183 | 1,984 | | |
| 10 | 144 | 68 | 432 | 126 | 2,496 | 184 | 576 | | |
| 11 | 96 | 69 | 768 | 127 | 1,024 | 185 | 1,824 | | |
| 12 | 96 | 70 | 1,152 | 128 | 24 | 186 | 3,072 | | |
| 13 | 112 | 71 | 576 | 129 | 1,408 | 187 | 1,728 | | |
| 14 | 192 | 72 | 312 | 130 | 2,016 | 188 | 1,152 | | |
| 15 | 192 | 73 | 592 | 131 | 1,056 | 189 | 2,560 | | |
| 16 | 24 | 74 | 912 | 132 | 1,152 | 190 | 2,880 | | |
| 17 | 144 | 75 | 992 | 133 | 1,280 | 191 | 1,536 | | |

TABLE Z4-continued

| | | | | | | | | |
|---|---|---|---|---|---|---|---|---|
| 18 | 312 | 76 | 480 | 134 | 1,632 | 192 | 96 |
| 19 | 160 | 77 | 768 | 135 | 1,920 | 193 | 1,552 |
| 20 | 144 | 78 | 1,344 | 136 | 432 | 194 | 2,352 |
| 21 | 256 | 79 | 640 | 137 | 1,104 | 195 | 2,688 |
| 22 | 288 | 80 | 144 | 138 | 2,304 | 196 | 1,368 |
| 23 | 192 | 81 | 968 | 139 | 1,120 | 197 | 1,584 |
| 24 | 96 | 82 | 1,008 | 140 | 1,152 | 198 | 3,744 |
| 25 | 248 | 83 | 672 | 141 | 1,536 | 199 | 1,600 |
| 26 | 336 | 84 | 768 | 142 | 1,728 | 200 | 744 |
| 27 | 320 | 85 | 864 | 143 | 1,344 | 201 | 2,176 |
| 28 | 192 | 86 | 1,056 | 144 | 312 | 202 | 2,448 |
| 29 | 240 | 87 | 960 | 145 | 1,440 | 203 | 1,920 |
| 30 | 576 | 88 | 288 | 146 | 1,776 | 204 | 1,728 |
| 31 | 256 | 89 | 720 | 147 | 1,824 | 205 | 2,016 |
| 32 | 24 | 90 | 1,872 | 148 | 912 | 206 | 2,496 |
| 33 | 384 | 91 | 896 | 149 | 1,200 | 207 | 2,496 |
| 34 | 432 | 92 | 576 | 150 | 2,976 | 208 | 336 |
| 35 | 384 | 93 | 1,024 | 151 | 1,216 | 209 | 1,920 |
| 36 | 312 | 94 | 1,152 | 152 | 480 | 210 | 4,608 |
| 37 | 304 | 95 | 960 | 153 | 1,872 | 211 | 1,696 |
| 38 | 480 | 96 | 96 | 154 | 2,304 | 212 | 1,296 |
| 39 | 448 | 97 | 784 | 155 | 1,536 | 213 | 2,304 |
| 40 | 144 | 98 | 1,368 | 156 | 1,344 | 214 | 2,592 |
| 41 | 336 | 99 | 1,248 | 157 | 1,264 | 215 | 2,112 |
| 42 | 768 | 100 | 744 | 158 | 1,920 | 216 | 960 |
| 43 | 352 | 101 | 816 | 159 | 1,728 | 217 | 2,048 |
| 44 | 288 | 102 | 1,728 | 160 | 144 | 218 | 2,640 |
| 45 | 624 | 103 | 832 | 161 | 1,536 | 219 | 2,368 |
| 46 | 576 | 104 | 336 | 162 | 2,904 | 220 | 1,728 |
| 47 | 384 | 105 | 1,536 | 163 | 1,312 | 221 | 2,016 |
| 48 | 96 | 106 | 1,296 | 164 | 1,008 | 222 | 3,648 |
| 49 | 456 | 107 | 864 | 165 | 2,304 | 223 | 1,792 |
| 50 | 744 | 108 | 960 | 166 | 2,016 | 224 | 192 |
| 51 | 576 | 109 | 880 | 167 | 1,344 | 225 | 3,224 |
| 52 | 336 | 110 | 1,728 | 168 | 768 | 226 | 2,736 |
| 53 | 432 | 111 | 1,216 | 169 | 1,464 | 227 | 1,824 |
| 54 | 960 | 112 | 192 | 170 | 2,592 | 228 | 1,920 |
| 55 | 576 | 113 | 912 | 171 | 2,080 | | |
| 56 | 192 | 114 | 1,920 | 172 | 1,056 | | |
| 57 | 640 | 115 | 1,152 | 173 | 1,392 | | |

TABLE Z6

| | | | | | |
|---|---|---|---|---|---|
| 0 | 1 | 77 | 69,120 | 154 | 345,600 |
| 1 | 12 | 78 | 92,480 | 155 | 499,200 |
| 2 | 60 | 79 | 124,800 | 156 | 353,600 |
| 3 | 160 | 80 | 106,392 | 157 | 295,800 |
| 4 | 252 | 81 | 70,860 | 158 | 424,320 |
| 5 | 312 | 82 | 100,920 | 159 | 449,600 |
| 6 | 544 | 83 | 137,760 | 160 | 425,880 |
| 7 | 960 | 84 | 96,768 | 161 | 304,128 |
| 8 | 1,020 | 85 | 90,480 | 162 | 354,300 |
| 9 | 876 | 86 | 125,664 | 163 | 531,360 |
| 10 | 1,560 | 87 | 134,720 | 164 | 423,864 |
| 11 | 2,400 | 88 | 123,360 | 165 | 299,520 |
| 12 | 2,080 | 89 | 95,064 | 166 | 468,384 |
| 13 | 2,040 | 90 | 113,880 | 167 | 557,760 |
| 14 | 3,264 | 91 | 163,200 | 168 | 391,680 |
| 15 | 4,160 | 92 | 137,280 | 169 | 344,772 |
| 16 | 4,092 | 93 | 92,160 | 170 | 452,400 |
| 17 | 3,480 | 94 | 150,144 | 171 | 525,600 |
| 18 | 4,380 | 95 | 187,200 | 172 | 480,480 |
| 19 | 7,200 | 96 | 131,104 | 173 | 359,160 |
| 20 | 6,552 | 97 | 112,920 | 174 | 458,048 |
| 21 | 4,608 | 98 | 141,180 | 175 | 624,960 |
| 22 | 8,160 | 99 | 175,200 | 176 | 492,000 |
| 23 | 10,560 | 100 | 164,052 | 177 | 334,080 |
| 24 | 8,224 | 101 | 122,424 | 178 | 475,320 |
| 25 | 7,812 | 102 | 157,760 | 179 | 640,800 |
| 26 | 10,200 | 103 | 212,160 | 180 | 478,296 |
| 27 | 13,120 | 104 | 173,400 | 181 | 393,144 |
| 28 | 12,480 | 105 | 119,808 | 182 | 554,880 |
| 29 | 10,104 | 106 | 168,600 | 183 | 595,520 |
| 30 | 14,144 | 107 | 228,960 | 184 | 542,784 |
| 31 | 19,200 | 108 | 170,560 | 185 | 427,440 |
| 32 | 16,380 | 109 | 142,584 | 186 | 460,800 |
| 33 | 11,520 | 110 | 212,160 | 187 | 696,000 |
| 34 | 17,400 | 111 | 219,200 | 188 | 574,080 |
| 35 | 24,960 | 112 | 196,800 | 189 | 377,856 |
| 36 | 18,396 | 113 | 153,240 | 190 | 636,480 |
| 37 | 16,440 | 114 | 172,800 | 191 | 729,600 |

TABLE Z6-continued

| | | | | | |
|---|---|---|---|---|---|
| 38 | 24,480 | 115 | 274,560 | 192 | 524,320 |
| 39 | 27,200 | 116 | 212,184 | 193 | 447,000 |
| 40 | 26,520 | 117 | 148,920 | 194 | 564,600 |
| 41 | 20,184 | 118 | 236,640 | 195 | 707,200 |
| 42 | 23,040 | 119 | 278,400 | 196 | 592,956 |
| 43 | 36,960 | 120 | 213,824 | 197 | 465,720 |
| 44 | 31,200 | 121 | 174,252 | 198 | 595,680 |
| 45 | 22,776 | 122 | 223,320 | 199 | 792,000 |
| 46 | 35,904 | 123 | 269,120 | 200 | 664,020 |
| 47 | 44,160 | 124 | 249,600 | 201 | 430,848 |
| 48 | 32,800 | 125 | 195,312 | 202 | 612,120 |
| 49 | 28,236 | 126 | 238,272 | 203 | 808,320 |
| 50 | 39,060 | 127 | 322,560 | 204 | 603,200 |
| 51 | 46,400 | 128 | 262,140 | 205 | 524,784 |
| 52 | 42,840 | 129 | 177,408 | 206 | 721,344 |
| 53 | 33,720 | 130 | 265,200 | 207 | 770,880 |
| 54 | 44,608 | 131 | 343,200 | 208 | 695,640 |
| 55 | 62,400 | 132 | 241,920 | 209 | 518,400 |
| 56 | 49,344 | 133 | 207,360 | 210 | 599,040 |
| 57 | 34,560 | 134 | 305,184 | 211 | 890,400 |
| 58 | 50,520 | 135 | 341,120 | 212 | 708,120 |
| 59 | 69,600 | 136 | 295,800 | 213 | 483,840 |
| 60 | 54,080 | 137 | 225,240 | 214 | 778,464 |
| 61 | 44,664 | 138 | 253,440 | 215 | 960,960 |
| 62 | 65,280 | 139 | 386,400 | 216 | 674,368 |
| 63 | 70,680 | 140 | 324,480 | 217 | 552,960 |
| 64 | 65,532 | 141 | 211,968 | 218 | 712,920 |
| 65 | 53,040 | 142 | 342,720 | 219 | 852,800 |
| 66 | 57,600 | 143 | 408,000 | 220 | 811,200 |
| 67 | 89,760 | 144 | 298,716 | 221 | 591,600 |
| 68 | 73,080 | 145 | 262,704 | 222 | 745,280 |
| 69 | 50,688 | 146 | 319,800 | 223 | 994,560 |
| 70 | 84,864 | 147 | 376,480 | 224 | 786,624 |
| 71 | 100,800 | 148 | 345,240 | 225 | 570,276 |
| 72 | 74,460 | 149 | 266,424 | 226 | 766,200 |
| 73 | 63,960 | 150 | 354,144 | 227 | 1,030,560 |
| 74 | 82,200 | 151 | 456,000 | 228 | 725,760 |
| 75 | 104,160 | 152 | 370,080 | | |
| 76 | 93,600 | 153 | 254,040 | | |

TABLE Z12

| | | | | | |
|---|---|---|---|---|---|
| 0 | 1 | 77 | 21,654,935,808 | 154 | 714,637,972,224 |
| 1 | 24 | 78 | 23,917,274,304 | 155 | 715,961,510,400 |
| 2 | 264 | 79 | 24,615,220,608 | 156 | 719,692,526,784 |
| 3 | 1,760 | 80 | 25,376,943,024 | 157 | 763,113,874,512 |
| 4 | 7,944 | 81 | 28,009,137,752 | 158 | 812,342,889,600 |
| 5 | 25,872 | 82 | 30,586,037,328 | 159 | 816,313,861,440 |
| 6 | 64,416 | 83 | 31,513,408,608 | 160 | 812,060,601,264 |
| 7 | 133,056 | 84 | 32,579,551,488 | 161 | 865,462,338,048 |
| 8 | 253,704 | 85 | 35,508,322,080 | 162 | 924,314,846,664 |
| 9 | 472,760 | 86 | 38,810,229,216 | 163 | 920,507,154,912 |
| 10 | 825,264 | 87 | 40,037,878,848 | 164 | 920,361,668,688 |
| 11 | 1,297,056 | 88 | 40,859,536,608 | 165 | 982,725,974,784 |
| 12 | 1,938,336 | 89 | 44,672,951,664 | 166 | 1,039,906,730,016 |
| 13 | 2,963,664 | 90 | 48,932,378,352 | 167 | 1,039,128,015,552 |
| 14 | 4,437,312 | 91 | 49,926,264,960 | 168 | 1,040,478,667,008 |
| 15 | 6,091,584 | 92 | 51,130,316,736 | 169 | 1,102,867,760,040 |
| 16 | 8,118,024 | 93 | 55,883,287,552 | 170 | 1,171,757,692,512 |
| 17 | 11,368,368 | 94 | 60,547,082,112 | 171 | 1,174,521,854,176 |
| 18 | 15,653,352 | 95 | 61,923,031,104 | 172 | 1,167,835,079,136 |
| 19 | 19,822,176 | 96 | 63,385,408,416 | 173 | 1,239,722,456,016 |
| 20 | 24,832,944 | 97 | 68,696,763,696 | 174 | 1,321,246,238,400 |
| 21 | 32,826,112 | 98 | 74,577,903,048 | 175 | 1,313,545,628,736 |
| 22 | 42,517,728 | 99 | 76,393,194,528 | 176 | 1,307,424,001,248 |
| 23 | 51,425,088 | 100 | 77,602,957,944 | 177 | 1,395,533,705,856 |
| 24 | 61,903,776 | 101 | 84,080,984,592 | 178 | 1,474,191,694,800 |
| 25 | 78,146,664 | 102 | 91,461,572,928 | 179 | 1,470,135,873,888 |
| 26 | 98,021,616 | 103 | 92,741,489,856 | 180 | 1,472,419,748,592 |
| 27 | 115,331,264 | 104 | 94,198,772,976 | 181 | 1,554,105,008,016 |
| 28 | 133,522,752 | 105 | 102,562,521,600 | 182 | 1,647,547,321,728 |
| 29 | 164,079,696 | 106 | 110,403,610,416 | 183 | 1,648,658,651,200 |
| 30 | 201,364,416 | 107 | 112,206,096,288 | 184 | 1,632,926,218,176 |
| 31 | 229,101,312 | 108 | 114,458,740,800 | 185 | 1,734,153,444,192 |
| 32 | 259,776,264 | 109 | 123,091,514,832 | 186 | 1,844,175,455,232 |
| 33 | 314,269,824 | 110 | 132,910,417,728 | 187 | 1,829,372,897,088 |
| 34 | 374,842,512 | 111 | 135,359,463,232 | 188 | 1,821,916,743,552 |
| 35 | 420,258,432 | 112 | 136,447,747,392 | 189 | 1,937,378,426,368 |
| 36 | 471,023,592 | 113 | 147,394,340,016 | 190 | 2,043,436,190,400 |
| 37 | 554,746,896 | 114 | 159,500,457,600 | 191 | 2,033,547,631,104 |
| 38 | 653,690,400 | 115 | 160,956,544,896 | 192 | 2,028,332,946,336 |

TABLE Z12-continued

| | | | | | |
|---|---|---|---|---|---|
| 39 | 724,846,144 | 116 | 162,940,575,600 | 193 | 2,142,281,587,248 |
| 40 | 793,078,704 | 117 | 176,121,743,248 | 194 | 2,267,057,828,112 |
| 41 | 927,125,232 | 118 | 188,740,015,200 | 195 | 2,265,622,499,712 |
| 42 | 1,082,704,128 | 119 | 190,918,949,760 | 196 | 2,244,116,900,808 |
| 43 | 1,175,873,952 | 120 | 193,511,203,776 | 197 | 2,373,665,758,992 |
| 44 | 1,279,397,088 | 121 | 207,502,774,008 | 198 | 2,521,003,646,304 |
| 45 | 1,482,713,808 | 122 | 222,973,423,728 | 199 | 2,496,637,706,688 |
| 46 | 1,699,194,816 | 123 | 226,147,998,912 | 200 | 2,478,371,203,704 |
| 47 | 1,834,739,328 | 124 | 227,429,983,488 | 201 | 2,635,440,022,912 |
| 48 | 1,980,797,856 | 125 | 244,215,894,432 | 202 | 2,774,666,532,528 |
| 49 | 2,259,791,448 | 126 | 263,101,540,416 | 203 | 2,758,012,109,952 |
| 50 | 2,578,950,264 | 127 | 264,312,339,456 | 204 | 2,752,161,876,288 |
| 51 | 2,771,448,768 | 128 | 266,010,877,704 | 205 | 2,897,346,782,880 |
| 52 | 2,949,559,536 | 129 | 286,962,805,888 | 206 | 3,060,483,556,416 |
| 53 | 3,345,875,856 | 130 | 306,415,571,616 | 207 | 3,053,047,659,072 |
| 54 | 3,803,764,800 | 131 | 308,637,532,896 | 208 | 3,014,173,603,056 |
| 55 | 4,028,054,976 | 132 | 312,172,889,472 | 209 | 3,190,254,080,640 |
| 56 | 4,264,256,832 | 133 | 332,945,133,312 | 210 | 3,384,533,104,128 |
| 57 | 4,833,186,688 | 134 | 356,433,028,512 | 211 | 3,345,812,189,280 |
| 58 | 5,414,943,600 | 135 | 360,323,811,456 | 212 | 3,322,145,004,336 |
| 59 | 5,719,271,712 | 136 | 360,223,654,032 | 213 | 3,521,864,694,528 |
| 60 | 6,059,238,336 | 137 | 386,088,721,392 | 214 | 3,702,736,569,312 |
| 61 | 6,756,214,608 | 138 | 414,603,535,104 | 215 | 3,676,376,713,152 |
| 62 | 7,558,096,128 | 139 | 415,108,384,416 | 216 | 3,655,417,972,800 |
| 63 | 7,972,913,344 | 140 | 417,392,122,752 | 217 | 3,849,584,302,080 |
| 64 | 8,312,839,944 | 141 | 447,681,704,448 | 218 | 4,061,967,241,200 |
| 65 | 9,284,959,200 | 142 | 476,316,548,928 | 219 | 4,046,622,779,584 |
| 66 | 10,374,325,632 | 143 | 478,377,518,784 | 220 | 3,999,395,297,088 |
| 67 | 10,801,349,856 | 144 | 481,341,997,032 | 221 | 4,217,474,077,344 |
| 68 | 11,279,351,952 | 145 | 512,942,325,984 | 222 | 4,466,860,398,528 |
| 69 | 12,564,531,456 | 146 | 547,290,900,816 | 223 | 4,411,797,088,512 |
| 70 | 13,871,037,312 | 147 | 551,426,235,360 | 224 | 4,366,319,445,312 |
| 71 | 14,433,084,864 | 148 | 550,868,402,352 | 225 | 4,633,748,755,400 |
| 72 | 15,042,871,272 | 149 | 587,521,351,824 | 226 | 4,864,028,873,616 |
| 73 | 16,585,653,744 | 150 | 629,263,864,416 | 227 | 4,821,900,001,248 |
| 74 | 18,306,804,912 | 151 | 628,022,995,776 | 228 | 4,799,513,769,600 |
| 75 | 19,068,642,080 | 152 | 628,196,474,400 | | |
| 76 | 19,670,138,400 | 153 | 673,500,182,256 | | |

There has been described a preferred embodiment of an encoding, detecting and decoding method wherein the modified Leech matrix is used, at the encoder to modify the coordinates for transmission which coordinates, so modified, are used in the detection and decoding means. The modified Leech matrix involves both column rearranging and row conversions of the conventional Leech matrix.

In an alternate form of the invention, it is possible to use the novel detection methods with received transmissions which have been encoded in accord with other matrices having the same column arrangement as the modified Leech matrix. That is with matrices which have the same column arrangement as the modified matrix but a different row arrangement called here SCDR Matrix for brevity (although any row of a different row arrangement must be derivable from the modified matrix rows by mod 2 sums which include the original modified matrix now). Since all such SCDR matrices will give the same 4096 pattern vectors as the modified matrix all detection may equivalently be used for the encode and decode means with the algorithm as provided herein with one change. The thirteen bits thus derived at the detector identity rows of the modified Leech matrix rather than the matrix actually used at the encoder. Thus these thirteen bits must be converted to thirteen corresponding buts which are the determinant for the SCDR matrix used. Such conversion may be performed by well known methods, such as by the use of a 13×13 binary matrix or by look up table.

In a further alternative it is possible to use the novel detection means and method with encoder matrices of the form of the Conventional Leech matrix or derived therefrom (or otherwise using a column arrangement different from that of the modified matrix) column changes used for the new matrix. Such matrices are designated here DC matrices for brevity. Encoding is performed in accord with the DC matrix and this is modulated and transmitted to the receiver. After demodulation the column arrangement is altered to conform to that of a Modified Leech matrix. The newly placed received coordinates are then subjected to the detection algorithms steps 1 to 5 as described herein. With the 13 bits derived it is now necessary to take into account any difference in row conversion. This may be done by mapping the 13 derived bits into a new 13 bits in accord with the use of a 13×13 binary matrix by techniques well known to those skilled in the art. With the new 13 bits rows of the modified matrix may be sumed mod 2 to indicate the pattern vector with the modified matrix place order. With such pattern vector it is possible to do one of two things: (a) to modify the stored altered place coordinate values in accord with steps 7 & 8 and then reverse the alterations in the coordinate places to produce the order used at the transmitter, then continuing with step 9 of the detection algorithm; or (b) reversing the alterations in the places of the pattern vector and using the reversed alteration pattern vector to modify the coordinates as received before alternation then continuing with step 6.

It will be noted that the provision in a matrix derived from the conventional Leech matrix by column shifts and by row combining in the ways previously discussed which contain as three of the nine rows:

| | | |
|---|---|---|
| 1 1 1 1 1 1 1 1 | 0 0 0 0 0 0 0 0 | 0 0 0 0 0 0 0 0 |
| 0 0 0 0 0 0 0 0 | 1 1 1 1 1 1 1 1 | 0 0 0 0 0 0 0 0 |
| 0 0 0 0 0 0 0 0 | 0 0 0 0 0 0 0 0 | 1 1 1 1 1 1 1 1 | where consecutive or not, determines the fact that the octuples produced by pattern vectors derived from the derived matrix may be classified into 64 complementary pairs.

ROW ADDITION TABLE

This is the extended form of the row transition of the modified Leech matrix.

(11,2) means row 11 of the Conventional Leech matrix was added place by place mod 2 to form a new row 2, row 11 remaining as it was. Thus the second step 2, 11 requires new row 2 to be added place by place, mod 2 to form a new row 11. This logic is continued throughout. It is not suggested that this is the shortest or only method of deriving the row arrangement of the modified from the Conventional Leech matrix. Elsewhere discussed, is the columns' rearrangement to get from the conventional to modified Leech matrix.

| | | | | |
|---|---|---|---|---|
| (11,2) | (7,9) | (10,11) | (4,8) | (8,4) |
| (2,11) | (7,10) | (11,10) | (4,12) | (8,7) |
| (3,4) | (7,11) | (10,11) | (6,5) | (8,9) |
| (3,5) | (7,12) | (11,12) | (5,6) | (8,11) |
| (3,6) | (8,7) | (12,11) | (5,4) | (12,10) |
| (3,7) | (8,6) | (11,12) | (5,3) | (10,12) |
| (3,9) | (9,2) | (1,2) | (5,3) | (10,9) |
| (4,5) | (9,3) | (1,4) | (5,8) | (10,7) |
| (4,6) | (10,12) | (1,7) | (5,12) | (10,5) |
| (4,9) | (10,9) | (1,11) | (12,6) | (10,2) |
| (6,5) | (10,8) | (1,12) | (6,5) | (11,10) |
| (5,6) | (10,6) | (2,3) | (6,7) | (11,9) |
| (5,3) | (10,5) | (2,5) | (6,8) | (11,2) |
| (5,9) | (10,2) | (2,6) | (6,11) | (12,11) |
| (5,11) | (7,3) | (2,7) | (6,12) | (12,9) |
| (8,6) | (8,3) | (2,11) | (11,9) | (12,7) |
| (6,8) | (9,3) | (2,12) | (9,2) | (12,6) |
| (6,3) | (11,4) | (4,3) | (9,3) | (12,4) |
| (6,9) | (11,3) | (3,4) | (9,4) | (12,2) |
| (6,10) | (11,2) | (3,2) | (9,7) | |
| (6,11) | (12,11) | (3,6) | (9,10) | |
| (6,12) | (12,10) | (3,7) | (9,11) | |
| (8,7) | (12,9) | (3,9) | (11,7) | |
| (7,8) | (12,8) | (3,11) | (7,11) | |
| (7,2) | (12,7) | (3,12) | (7,9) | |
| (7,3) | (12,6) | (6,4) | (7,3) | |
| | (12,4) | (4,3) | (8,3) | |
| | | (4,6) | | |

As previously stated 'mod' is used as an abbreviation for 'modulo' herein.

I claim:

1. Means for detecting coordinate signal values transmitted in sets of 24 modified in accord with pattern vectors derived from a Leech matrix having three rows:

| | | |
|---|---|---|
| 1 1 1 1 1 1 1 1 | 0 0 0 0 0 0 0 0 | 0 0 0 0 0 0 0 0 |
| 0 0 0 0 0 0 0 0 | 1 1 1 1 1 1 1 1 | 0 0 0 0 0 0 0 0 |
| 0 0 0 0 0 0 0 0 | 0 0 0 0 0 0 0 0 | 1 1 1 1 1 1 1 1 | wherein the coordinates were originally 0 modulo 4 and modified to be all even or all odd, where even coordinates are zero or two modulo 4, and odd coordinates are one or three modulo four, in each case dependent upon whether the selected pattern vector from said Leech matrix has a one or a zero and where the sum of the coordinates is 0 modulo 8 for even coordinates and 4 modulo 8 for odd coordinates, means for receiving the signals derived from said transmitted signal values, means for demodulating the received signals to detect 24 signal values, means for storing such values, means for providing such values modulo 4, means for each value modulo 4 determining measures of the error if the transmitted modulo coordinate values were 0,1,2,3 respectively, and the penalty, being the measure of the increase in measure of the error for transmitted coordinate values of the next nearest transmitted coordinate differing by four, where an octuple is a series of values cooresponding to places 1–8, 9–16 or 17–24, of the 24 values, for each octuple means determining the sum of the coordinate error measures, and determining the smallest penalty in altering the mod 8 sum of the coordinates by altering a coordinate or substituting the complementary octuple, means arranging the 256 possible transmitted octuple of coordinates mod 4 derived from the pattern vectors of said Leech matrix in 64 complementary even coordinate pairs and 64 complementary odd coordinate pairs, means for each of the 128 pairs comparing each pair to determine which of the octuples in a pair have the lesser sum of error measures, means for storing this information, means for storing the information as to the smallest penalty and whether it involves substitution of the complementary octuple, and means for storing the information as to whether in any octuple of the received values there are an even or odd number of coordinates which are the same mod 8 as mod 4, means, for the 1024 possible combinations of triple octuples from the modified Leech matric, comparing these in groups of eights where the distinction between each group of eight triple octuples is solely determined by the selection eight available combinations of three rows of the said Leech matrix other than the rows previously recited, means for each group of eight triple octuples for determining the triple octuple with the lowest sum of error measures, as derived from the octuples forming part of the triple octuple, which satisfies the modulo sum rule for the coordinates, means determining from said triple octuple the Leech pattern vector used, and means for reversing the effect of being modified in accord with such pattern vectors provided at the encoder to provide the coordinates before being modified, means for determining the encoded information from said coordinates, the pattern vector and the choice of even or odd.

2. Means for detecting received coordinates transmitted as 24 coordinates modulated on a carrier which coordinate values were 0 mod 4 and modified in accord with a selected pattern vector of a Leech matrix and in accord with whether even or odd coordinates would be used, to provide:

for even coordinates, 0's and 2's mod 4 determined by the presence of 0's or 1's in the selected pattern vector and a mod sum of the coordinate values which is 0 and mod 8, for odd coordinates, 1's and 3's mod 4 determined by the presence of 0's or 1's in the selected pattern vectors and a sum of the coordinate values which is 4 mod 8, means on demodulating the received coordinate values and storing such demodulated values, means providing such demodulated values mod 4 and a measure of error of such value relative to possible coordinate values 0,1,2,3, where an octuple is the first, second or third eight places of a 24 place coordinate set or Leech matrix pattern vector and three such octuples make up 24 places, where the Leech matrix was selected to produce octuples which may all be classified in complementary pairs, means for determining the 256 possible values of octuples mod 4 present in possible Leech matrix pattern vectors, being 128 arrangements each of which may be even or odd, means for comparing complementary pairs of such octuples to determine which octuple in a pair has a lower total error measure relative to the relevant received values, storing the preferred candidate from each complementary pair, where the possible combinations of three rows of the said Leech matrix determine the complementary pairs, means using the possible combinations of a further three rows of the Leech matrix and the choice of even or odd coordinates to produce 128 groups of eight triple octuples, even group having candidates determined by the eight possible combinations of the further three rows, means determining for each group of eight the triple octuple with lowest sum of errors whereby the lowest triple octuples in each group of eight together comprise 128 candidates, means determining for each of the 128 candidates the sum of the error measures for the 24 coordinates, of the triple octuple, and means determining the triple octuple with the lowest sum of error measures, means deriving from the determination lowest sum triple octuple the directions as to the remaining bits of the pattern vector to define the pattern vector, and even or odd, means for producing from the preceding determinations for determining the transmitted coordinates.

3. In means for signalling including means for encoding numeric data into coordinate sets of 24 modified in accord with a selected pattern vector derived from a Leech matrix wherein the coordinates had values which were 0 mod 4, modified to be all even or all odd and so that:

(a) even coordinates are 0 or 2 mod 4;
(b) odd coordinates are 1 or 3 mod 4;

in each of (a) and (b) dependant upon whether the pattern vector has a 1 or a 0 in the place corresponding to the coordinate, and where the sum of the coordinate values is 0 mod 8 for even coordinates and 4 mod 8 for odd coordinates, wherein the pattern vectors are derived from a Leech matrix obtained by placing the columns of a conventional Leech matrix in the order (using numbering of odd matrix columns)

1, 18, 24, 22, 19, 10, 23, 3, 6, 8, 21, 16, 12, 15, 17, 7, 9, 13, 2, 4, 14, 5, 20, 11, means for modulating a carrier in accord with said modified coordinate values and means for transmitting said modulated carrier.

4. In means for signalling including means for encoding numeric data into sets of 24 coordinates in accord with pattern vectors derived from a Leech matrix wherein the coordinates have values which were 0 mod 4, modified to be all even or all odd and so that:

(a) even coordinates are 0 mod 4 or 2 mod 4,
(b) odd coordinates are 1 mod 4 or 3 mod 4, in each of (a) or (b) dependant upon whether the pattern vector has a 1 or a 0 in the place corresponding to the coordinate, and where the sum of the coordinate values is 0 mod 8 for even coordinates and 4 mod 8 for odd coordinates, wherein the pattern vectors are those derivable from aa modified Leech matrix of the form:

| 1  | 11111111 | 00000000 | 00000000 |
|----|----------|----------|----------|
| 2  | 00000000 | 11111111 | 00000000 |
| 3  | 00000000 | 00000000 | 11111111 |
| 4  | 00001111 | 00001111 | 00000000 |
| 5  | 00110011 | 00110011 | 00000000 |
| 6  | 01010101 | 01010101 | 00000000 |
| 7  | 00000000 | 00001111 | 00001111 |
| 8  | 00000000 | 00110011 | 00110011 |
| 9  | 00000000 | 01010101 | 01010101 |
| 10 | 01001101 | 01001101 | 01001101 |
| 11 | 01010011 | 01010011 | 01010011 |
| 12 | 01110100 | 01110100 | 01110100 | means for modulating said coordinates on a carrier and means for transmitting said modulated carrier.

5. In means for signalling including means for encoding numeric data into coordinate sets of 24 in accord with pattern vectors derived from a Leech matrix wherein the coordinates have values which are 0 mod 4, modified to be all even or all odd and so that:
   (a) even coordinates are 0 or 2 mod 4,
   (b) odd coordinates are 1 or 3 mod 4,
in each of (a) or (b) dependant upon whether the pattern vector has a 1 or a 0 in the place corresponding to the coordinate,
   and where the sum of the coordinate values is 0 mod 8 for even coordinates and 4 mod 8 for odd coordinates,
   wherein the pattern vectors are derivable from a modified Leech matrix including the row patterns:

| | | |
|---|---|---|
| 11111111 | 00000000 | 00000000 |
| 00000000 | 11111111 | 00000000 |
| 00000000 | 00000000 | 11111111 | as three of the 12 rows,
means for modulating said coordinates on a carrier,
means for transmitting said carrier.

6. Means for detecting and decoding signals containing numeric data modulated on a carrier in coordinate sets of 24 which signals were derived from 24 coordinate values 0 mod 4, modified to be all even or all odd and modified in accord with a pattern vector of a Leech matrix so that:
   (a) even coordinates being 0 mod 4 or 2 mod 4;
   (b) odd coordinates being 1 mod 4 or 3 mod 4;
in each of (a) and (b) dependant upon whether the pattern vector has a 1 or a 0 in the place corresponding to the coordinates,
   and where the sum of the coordinate values is 0 mod 8 for even coordinates and 4 mod 8 for odd coordinates,
   wherein the pattern vectors are derived from a Leech matrix obtained by placing the columns of a conventional Leech lattice in the order (using numbering of old matric columns):
   1, 18, 24, 22, 19, 10, 23, 3, 6, 8, 21, 16, 12, 15, 17, 7, 9, 13, 2, 4, 14, 5, 20, 11,
means for receiving and demodulating such signals to provide 24 coordinate values, constituting 3 receive octuples,
means for determining for each received octuple and each possible octuple provided by the encoding system used, a measure the error involved in accepting its coordinate values as the corresponding octuple of transmitted values and from this which of each of 128 pairs of complementary candidate octuples is a more likely candidate to represent the corresponding received octuple conditionally including in said measure of error the smallest increase in the event that a coordinate must be altered or a complementary octuple substituted to change the modulo sum of the coordinates,
with such more likely pair candidates determining which permissible combination of 3 octuples has the lowest sum of measures of error, when the mod 8 sum rule is satisfied; on this basis determining the best 24 coordinates mod 4 to represent the received coordinates,
means for determining the pattern vector therefrom,
means for deriving the 0 mod 4 coordinates from the values of the received coordinates and the determined pattern vector and the choice of even or odd,
means for deriving the numeric data represented by the 24 coordinates modulated on the carrier.

7. Means for detecting and decoding numeric data signals modulated on a carrier in coordinate sets of 24 which signals were derived from 24 coordinate values 0 mod 4, modified to be all even or all odd and modified in accord with a pattern vector of a Leech matrix so that:
   (a) even coordinates are 0 mod 4 or 2 mod 4;
   (b) odd coordinates are 1 mod 4 or 3 mod 4;
in each of (a) and (b) dependant upon whether the pattern vector has a 1 or a 0 in the place corresponding to the coordinate,
   and where the sum of the coordinate values is 0 mod 8 for even coordinates and 4 mod 8 for odd coordinates,
   wherein the pattern vectors are derivable from a modified Leech matrix:

| | | | |
|---|---|---|---|
| 1 | 11111111 | 00000000 | 00000000 |
| 2 | 00000000 | 11111111 | 00000000 |
| 3 | 00000000 | 00000000 | 11111111 |
| 4 | 00001111 | 00001111 | 00000000 |
| 5 | 00110011 | 00110011 | 00000000 |
| 6 | 01010101 | 01010101 | 00000000 |
| 7 | 00000000 | 00001111 | 00001111 |
| 8 | 00000000 | 00110011 | 00110011 |
| 9 | 00000000 | 01010101 | 01010101 |
| 10 | 01001101 | 01001101 | 01001101 |
| 11 | 01010011 | 01010011 | 01010011 |
| 12 | 01110100 | 01110100 | 01110100 | means for receiving and demodulating the transmitted signal,
means for determining for each octuple of the received coordinates and for each octuple derivable from a pattern vector and the choice of even or odd, a measure of the error involved in accepting the derivable octuples coordinates values mod 4 as the values of the received octuple and the penalty for the lowest increase in measure of error if the candidate octuple must be altered or substituted for to correct the module 8 sum,
means for comparing said derivable octuples in complementary pairs to determine which of the pairs has the lower error measure,
means with such lower error measure of a pair candidates for determining which permissable combination of three octuples has the lowest sum of measure of error,
means if the sum modulo 8 does not satisfy the modulo sum rules, to increase the octuple of the three with the smallest error by the corresponding penalty, on this basis determining the best 24 coordinates mod 4 to represent the received coordinates,
means for determining therefrom the pattern vector employed,
means for deriving the 0 mod 4 coordinates from the values of the received coordinates and the selected pattern vector,
means for deriving the numeric data from the coordinates, the pattern vector and the choice of even or odd.

8. Means for detecting and decoding information containing signals mdoulated on a carrier in coordinate sets of 24 which signals were derived from 24 coordinate values 0 mod 4, modified to be all even or all odd and modified in accord with a pattern vector of a Leech matrix so that:
(a) even coordinates are 0 or 2 mod 4;
(b) odd coordinates are 1 or 3 mod 4;
in each of (a) and (b) dependant upon whether the pattern vector has a 1 or a 0 in the place corresponding to the coordinates,
and where the sum of the coordinate values is 0 mod 8 for even coordinates and 4 mod 8 for odd coordinates,
wherein the pattern vectors are derivable from a conventional Leech matrix with or without the interchange of rows,
means for receiving and demodulating said signals to produce 24 received coordinate signals,
means at the receiver to make the place changes in said 24 coordinate signals required to convert the Leech matrix used into a matrix derivable from the matrix,

| | | | |
|---|---|---|---|
| 1 | 11111111 | 00000000 | 00000000 |
| 2 | 00000000 | 11111111 | 00000000 |
| 3 | 00000000 | 00000000 | 11111111 |
| 4 | 00001111 | 00001111 | 00000000 |
| 5 | 00110011 | 00110011 | 00000000 |
| 6 | 01010101 | 01010101 | 00000000 |
| 7 | 00000000 | 00001111 | 00001111 |
| 8 | 00000000 | 00110011 | 00110011 |
| 9 | 00000000 | 01010101 | 01010101 |
| 10 | 01001101 | 01001101 | 01001101 |
| 11 | 01010011 | 01010011 | 01010011 |
| 12 | 01110100 | 01110100 | 01110100 | by row changes only,
means for determining each octuple of the place changed received coordinates and each octuple derivable from the last mentioned matrix and a choice of even or odd, a measure of the error involved in accepting its coordinate values mod 4 and the penalty for the lowest increase in measure of error of the candidate octuple must be altered or substituted for, to correct the modulo 8 sum,
means for comparing said derivable pair octuples in complementary pairs to determine which of the pairs has the lower error measure,
means with lower measure of a pair candidate determining which permissable combination of three octuples has the lowest sum of measures of error,
means if the sum modulo 8 does not satisfy the modulo sum rules to increase the octuple of the three with the smallest error,
on the basis of this determining the best 24 coordinates mod 4 to represent the received coordinates in the revised column order,
means for determining therefrom the pattern vector employed and the coordinates transmitted both with the original place order of the coordinates,
means for deriving the information from the coordinate pattern vector and the choice of even or odd.

9. Means for receiving, detecting and decoding information containing signals, modulated on a carrier, encoded in 24 coordinates, 0 mod 4 modified in accord with a pattern vector derived from a Leech matrix,
means for demodulating said signals,
means for arranging the places of such signals to correspond to the column changes required to convert the matrix used at the transmitter to a matrix which will produce the same pattern vectors as the matrix:

| | | | |
|---|---|---|---|
| 1 | 11111111 | 00000000 | 00000000 |
| 2 | 00000000 | 11111111 | 00000000 |
| 3 | 00000000 | 00000000 | 11111111 |
| 4 | 00001111 | 00001111 | 00000000 |
| 5 | 00110011 | 00110011 | 00000000 |
| 6 | 01010101 | 01010101 | 00000000 |
| 7 | 00000000 | 00001111 | 00001111 |
| 8 | 00000000 | 00110011 | 00110011 |
| 9 | 00000000 | 01010101 | 01010101 |
| 10 | 01001101 | 01001101 | 01001101 |
| 11 | 01010011 | 01010011 | 01010011 |
| 12 | 01110100 | 01110100 | 01110100 | considering a set of 24 signal values as three consecutive octuples,
where there are 128 possible even coordinate mod 4 octuples mod 4 and 128 possible odd coordinate octuples and where said possible octuples may be arranged in 64 even pairs which are complements and 64 odd pairs of octuples with each pair having complementary values,
means for calculating the measure of the error between the received coordinate value mod 4 and the possible octuple, for each pair,
means for designating the one of the pairs with lower error measure, and a measure of the penalty being the increase in the error and the better candidate of the two if coordinate or octuple must be replaced with the smallest increased error to correct the modulo sum of the octuple,
means for determining for the 1024 even and 1024 odd combinations of three consecutive octuples the candidate with the lowest sum of such measure of error with necessary correction for module sum of the coordinate values,
means for deriving from such three octuple candidates the pattern vector used,
means for converting the pattern vector to reverse the column changes between the encoding matrix and the detecting matrix,
means for converting the pattern vector to reverse the row changes between the encoding matrix and the detecting matrix, to produce the encoding pattern vector,
means for modifying the received values of the received coordinates to reverse the effect of the encoding pattern vector,
means for deriving the information from the derived coordinates, the encoding pattern vector and the choice of even or odd.

10. Means for detecting transmitted value sets of 24 coordinates which had values 0 mod 4 and were modified place by place in accord with a selected pattern vector of a Leech matrix to be 0 or 2 mod 4 or 1 or 3 mod 4 in accord with the 1's or 0's in the pattern vector, and to sum to 0 mod 8 for even coordinates and 4 mod 8 for odd coordinates,
means for arranging the places of the received coordinates to correspond to the column changes applicable to the Leech matrix used to produce a Leech matrix which will produce the same pattern vectors as the matrix:

| | | | |
|---|---|---|---|
| 1 | 11111111 | 00000000 | 00000000 |
| 2 | 00000000 | 11111111 | 00000000 |

| 3 | 00000000 | 00000000 | 11111111 |
|---|---|---|---|
| 4 | 00001111 | 00001111 | 00000000 |
| 5 | 00110011 | 00110011 | 00000000 |
| 6 | 01010101 | 01010101 | 00000000 |
| 7 | 00000000 | 00001111 | 00001111 |
| 8 | 00000000 | 00110011 | 00110011 |
| 9 | 00000000 | 01010101 | 01010101 |
| 10 | 01001101 | 01001101 | 01001101 |
| 11 | 01010011 | 01010011 | 01010011 |
| 12 | 01110100 | 01110100 | 01110100 | means for producing the transmitted values of the 24 coordinates mod 4, means for determining the relationship of each octuple of the 24 received values, and complementary pairs of the possible transmitted octuples using the available pattern vectors of the matrix set out above, to determine for each of the possible octuples a measure of the sum of the errors from the received values and a measure of the smallest penalty being the increase of error for altering the modulo sum of the octuple or for substituting its complement, means, for possible combinations of three octuples with the smaller error, for determining the sum of such errors, if the modulo sum is correct, and the sum of the errors plus the smallest penalty if the modulo sum is not correct and determining the pattern vector used in encoding and whether the coordinates are even or odd, means for rearranging received, detected coordinate places to reverse the previous changes, means for altering the received values of the coordinates to reverse the modification by the pattern vector at the encoder, means for deriving the information transmitted from the coordinates the pattern vector and the choice of even or old.

11. Means for detecting and decoding a set of 24 coordinates containing information and modulated on a carrier signal, which have encoded values 0 mod 4 modified in accord with a selected pattern vector derived from a Leech matrix, to provide all even values 0 or 2 mod 4 or all odd values 1 or 3 mod 4 in each case determined by whether the pattern vector has a 1 or a 0 at the corresponding coordinate place and having a sum of the coordinates which is 0 mod 8 for even coordinates and 4 mod 8 for odd coordinates, and which, so modified have been modulated on a carrier and transmitted, comprising:

means for demodulating said carrier signal to produce values corresponding to the modified coordinates, means for interchanging places of the received coordinates mod 4 to correspond to the column changes between the Leech matrix used at the encoder and the modified Leech matrix:

| 1 | 11111111 | 00000000 | 00000000 |
|---|---|---|---|
| 2 | 00000000 | 11111111 | 00000000 |
| 3 | 00000000 | 00000000 | 11111111 |
| 4 | 00001111 | 00001111 | 00000000 |
| 5 | 00110011 | 00110011 | 00000000 |
| 6 | 01010101 | 01010101 | 00000000 |
| 7 | 00000000 | 00001111 | 00001111 |
| 8 | 00000000 | 00110011 | 00110011 |
| 9 | 00000000 | 01010101 | 01010101 |
| 10 | 01001101 | 01001101 | 01001101 |
| 11 | 01010011 | 01010011 | 01010011 |
| 12 | 01110100 | 01110100 | 01110100 | means for determining measures of the errors corresponding to the assumption that octuples of the column changed received coordinates modulo 4 correspond respectively to complementary pairs of possible octuples derived from the modified Leech matrix and selecting the octuple from each pair with the lower error, and the octuple with the lowest error to alter with the other modulo sum, means for determining from possible 24 coordinate sets made of said selected octuples, the set with the lowest total of three octuple errors with the correct modulo sum, means for determining therefrom the corresponding pattern vector of the modified Leech lattice, means for determining therefrom the pattern vector used at the encoder, means for modifying the received coordinates to reverse the modification at the encoder and recover the information from the coordinates, the encoder pattern vector and the choice of even or odd.

12. Means for communicating information, comprising:

means for converting a block of information to a number N, means for producing the value N/8192=quotient M and the remainder C, means for selecting a Leech pattern vector and the choice of even or odd coordinates on the basis of C, means for encoding M into 24 coordinates which are 0 modulo 4, means for modifying said coordinates in accord with the 24 corresponding places of the pattern vector and the choice of even or odd coordinates to produce 24 coordinates which are 0 or 2 mod 4 or 1 or 3 mod 4, means for modulating said modified coordinates on a carrier, means for transmitting said coordinates, means for receiving and demodulating said coordinates, means for making any alteration in the places to correspond to the column changes required to convert the matrix used at the encoder to the modified Leech matrix:

| 1 | 11111111 | 00000000 | 00000000 |
|---|---|---|---|
| 2 | 00000000 | 11111111 | 00000000 |
| 3 | 00000000 | 00000000 | 11111111 |
| 4 | 00001111 | 00001111 | 00000000 |
| 5 | 00110011 | 00110011 | 00000000 |
| 6 | 01010101 | 01010101 | 00000000 |
| 7 | 00000000 | 00001111 | 00001111 |
| 8 | 00000000 | 00110011 | 00110011 |
| 9 | 00000000 | 01010101 | 01010101 |
| 10 | 01001101 | 01001101 | 01001101 |
| 11 | 01010011 | 01010011 | 01010011 |
| 12 | 01110100 | 01110100 | 01110100 | for each octuple of said coordinates, means for determining a measure of the error relative to each octuple available from use of the modified Leech matrix and the choice of even or odd coordinates and a measure of the smallest increase in error involved in changing one coordinate by 4 or replacing the octuple by the complementary octuple, means for the possible sets of three available octuples, determining the set with the smallest error and the correct modulo sum, means for said set determining the corresponding pattern vector, means for converting said pattern vector to that used at the encoder, means for modifying the received coordinate values in accord with the modified pattern vector, means for determining from the modified received coordinate values the number N.

13. Method of encoding numeric data into coordinate sets of 24 modified in accord with a selected pattern vector derived from a Leech matrix wherein the coordinates had values which were 0 mod 4, modified to be all even or all odd and so that:
  (a) even coordinates are 0 or 2 mod 4;
  (b) odd coordinates are 1 or 3 mod 4;

in each of (a) and (b) dependant upon whether the pattern vector has a 1 or a 0 in the place corresponding to the coordinate, and where the sum of the coordinate values is 0 mod 8 for even coordinates and 4 mod 8 for odd coordinates, wherein the pattern vectors are derived from a Leech matrix obtained by placing the columns of a conventional Leech matrix in the order (using numbering of old matrix columns):
1,18,24,22,19,10,23,3,6,8,21,16,12,15,17,7,9,13,2,4,14,15,20,11, modulating said coordinates on a carrier and transmitting said modulated carrier.

14. Method of signalling comprising:

encoding numeric data into sets of 24 coordinates in accord with pattern vectors derived from a Leech matrix wherein the coordinates have values which were 0 mod 4, modified to be all even or all odd and so that:
  (a) even coordinates are 0 or 2 mod 4;
  (b) odd coordinates are 1 or 3 mod 4;

in each of (a) or (b) dependant upon whether the pattern vector has a 1 or a 0 in the place corresponding to the coordinates, and where the sum of the coordinate values is 0 mod 8 for even coordinates and 4 mod 8 for odd coordinates, wherein the pattern vectors are those deriveable from a modified Leech matrix of the form:

| 1  | 11111111 | 00000000 | 00000000 |
|----|----------|----------|----------|
| 2  | 00000000 | 11111111 | 00000000 |
| 3  | 00000000 | 00000000 | 11111111 |
| 4  | 00001111 | 00001111 | 00000000 |
| 5  | 00110011 | 00110011 | 00000000 |
| 6  | 01010101 | 01010101 | 00000000 |
| 7  | 00000000 | 00001111 | 00001111 |
| 8  | 00000000 | 00110011 | 00110011 |
| 9  | 00000000 | 01010101 | 01010101 |
| 10 | 01001101 | 01001101 | 01001101 |
| 11 | 01010011 | 01010011 | 01010011 |
| 12 | 01110100 | 01110100 | 01110100 | modulating said coordinates on a carrier and transmitting said modulated carrier.

15. Method of communicating information comprising:

converting a block of information into a number N, producing the value N/8192=quotient M and remainder C, selecting a Leech pattern vector and the choice of even or odd coordinates on the basis of C, encoding M into 24 coordinates which are 0 modulo 4, modifying said coordinates in accord with the 24 corresponding places of the pattern vector and the choice of even or odd coordinates to produce 24 coordinates which are 0 or 2 mod 4 or 1 or 3 mod 4, modulating said modified coordinates on a carrier, transmitting said coordinates, receiving and demodulating said coordinates, making any alteration in the places of the demodulated coordinates to correspond to the column changes required to convert the matrix used to the encoder, the modified Leech matrix:

| 1  | 11111111 | 00000000 | 00000000 |
|----|----------|----------|----------|
| 2  | 00000000 | 11111111 | 00000000 |
| 3  | 00000000 | 00000000 | 11111111 |
| 4  | 00001111 | 00001111 | 00000000 |
| 5  | 00110011 | 00110011 | 00000000 |
| 6  | 01010101 | 01010101 | 00000000 |
| 7  | 00000000 | 00001111 | 00001111 |
| 8  | 00000000 | 00110011 | 00110011 |
| 9  | 00000000 | 01010101 | 01010101 |
| 10 | 01001101 | 01001101 | 01001101 |
| 11 | 01010011 | 01010011 | 01010011 |
| 12 | 01110100 | 01110100 | 01110100 | for used octuple of said coordinates, determining a measure of the error relative to each octuple available from use of the modified Leech matrix and the choice of even or odd coordinates and a measure of the smallest increase in error involved in changing one coordinates by for or replacing the octuple by the complementary octuple, from the possible sets of three available octuples, determining the set with the smallest error and the correct modulo sum, determining the corresponding pattern vector, converting said pattern vector to that used at the encoder, modifying the pattern vector to that used at the encoder, modifying the received coordinate values in accord with the modified pattern vector, determining from the modified received coordinate values the number N.

* * * * *